US012761967B2

(12) United States Patent
Doshi et al.

(10) Patent No.: US 12,761,967 B2
(45) Date of Patent: Oct. 13, 2026

(54) BATCH SCHEDULING OF MULTIPLE POD REQUEST

(71) Applicant: Rakuten Symphony, Inc., Tokyo (JP)

(72) Inventors: Tushar Anil Doshi, Santa Clara, CA (US); Sandeep Yelburgi, Bangalore (IN)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/250,863

(22) PCT Filed: Dec. 9, 2022

(86) PCT No.: PCT/US2022/052383
§ 371 (c)(1),
(2) Date: Apr. 27, 2023

(87) PCT Pub. No.: WO2024/123345
PCT Pub. Date: Jun. 13, 2024

(65) Prior Publication Data
US 2025/0291638 A1 Sep. 18, 2025

(51) Int. Cl.
*G06F 9/46* (2006.01)
*G06F 9/48* (2006.01)
*G06F 9/50* (2006.01)

(52) U.S. Cl.
CPC ............ *G06F 9/505* (2013.01); *G06F 9/4881* (2013.01); *G06F 9/5038* (2013.01); *G06F 2209/503* (2013.01)

(58) Field of Classification Search
None
See application file for complete search history.

(56) References Cited

U.S. PATENT DOCUMENTS

| | | | | |
|---|---|---|---|---|
| 7,574,424 | B2 | 8/2009 | Chowdhuri | |
| 9,250,953 | B2 * | 2/2016 | Kipp | G06F 9/5027 |
| 9,542,221 | B2 | 1/2017 | Harris | |
| 10,089,142 | B2 | 10/2018 | Plattner | |
| 10,404,699 | B2 | 9/2019 | Duggana | |
| 10,474,504 | B2 | 11/2019 | Wang | |
| 11,294,726 | B2 | 4/2022 | Bahramshahry | |

(Continued)

FOREIGN PATENT DOCUMENTS

| | | |
|---|---|---|
| CN | 104580396 B | 7/2018 |
| CN | 109542605 | 3/2019 |

(Continued)

*Primary Examiner* — Bing Zhao
(74) *Attorney, Agent, or Firm* — David R. Stevens; Stevens Law Group

(57) ABSTRACT

A method for organizing and deploying containerized applications within a cloud-network architecture framework. The steps include receiving a plurality of pod requests. The steps include organizing the plurality of pod requests into one or more batches. The steps include, for each of the one or more batches, determining a resource requirement for each pod request in the plurality of pod requests in the batch. The steps further include determining a host availability and a host resource availability of one or more hosts. The steps further include deploying each pod request in the plurality of pod requests in each of the one or more batches to the one of the one or more hosts based on the host availability and the host resource availability.

19 Claims, 17 Drawing Sheets

(56) References Cited

U.S. PATENT DOCUMENTS

| | | | |
|---|---|---|---|
| 2018/0321979 | A1 | 11/2018 | Bahramshahry |
| 2020/0174842 | A1 | 6/2020 | Wang et al. |
| 2022/0070069 | A1 | 3/2022 | Adogla |
| 2022/0318041 | A1 | 10/2022 | Perneti et al. |
| 2022/0357972 | A1 | 11/2022 | Singh et al. |

FOREIGN PATENT DOCUMENTS

| | | | |
|---|---|---|---|
| CN | 109978213 | B | 11/2021 |
| CN | 107547596 | | 1/2022 |
| CN | 113918270 | | 1/2022 |
| CN | 115080207 | | 9/2022 |

* cited by examiner

BATCH SCHEDULING OF MULTIPLE POD REQUEST

TECHNICAL FIELD

The present disclosure relates generally to pod distribution on cloud-network platforms, and specifically relates to actions associated with efficiently sorting and deploying batches of pods at scale.

SUMMARY

Disclosed herein is a method for organizing and deploying containerized applications within a cloud-network architecture framework. The steps include receiving a plurality of pod requests. The steps include organizing the plurality of pod requests into one or more batches. The steps include, for each of the one or more batches, determining a resource requirement for each pod request in the plurality of pod requests in the batch. The steps further include determining a host availability and a host resource availability of one or more hosts. The steps further include deploying each pod request in the plurality of pod requests in each of the one or more batches to the one of the one or more hosts based on the host availability and the host resource availability.

BACKGROUND

In a cloud-network architecture, planner can generally schedule only one pod planning request at a time. If there are a lot of requests coming in in a short span of time, there can be delay in serving those requests as there would be a queue of requests waiting for their turn as planner is serially responding to the planning requests. Traditionally, a system would need to handle each of these requests serially and determine the compute resource requirements and needs for each planning request as it is accepted by the system. However, at scale, processing each pod planning serially can result in significant wait times for systems at scale. There is a need for a way to organize pod planning in a way that will result in greater efficiency of speed and resource use in deploying pods to the system.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1A:
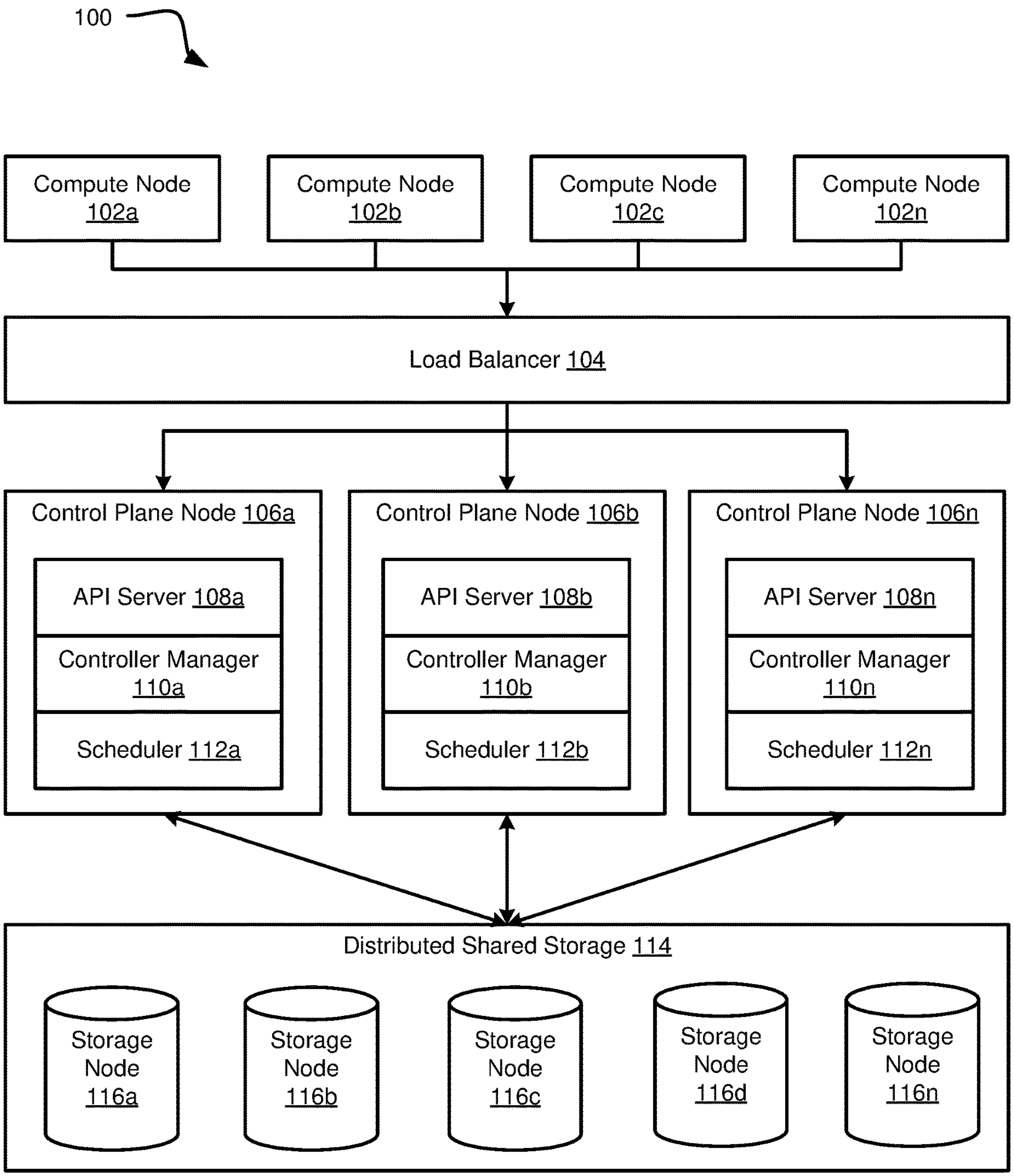
FIG. 1A is a schematic block diagram of a system for automated deployment, scaling, and management of containerized workloads and services, wherein the system draws on storage distributed across shared storage resources.

In a typical cloud-network architecture framework, the planner cannot handle multiple requests in one go, but it can handle one planning request with multiple items in it. It is possible to batch incoming requests within a certain timeframe, then send the request to the planner and plan the batch as one request. When the response comes from the planner, then the response is broken into multiple parts so that the responses can be sent to appropriate requests. A system according to the principles of the present disclosure may reduce time to plan a pod and pod compute resources or storage volume which can reduce overall deployment time as well as failover time that could impact application uptime.

A system may do all the plans serially since one pod plan can interfere with the planning of another. This may partly be because the planning of one pod can influence the planning decision of the other. A user may create a web server which will accept all planning requests and batch them as part of one request and handle the planning of multiple pods at once rather than planning them serially. For example, if each pod planning in an exemplary system takes five seconds, it may be possible to plan ten pods at once and combine those pods as a single group. This grouping may reduce total planning time because calculating all available resources would only need to be done once for the whole group as opposed to ten separate calculations for each pod.

An advantage in batching pod requests may be explained in the following example. If a system received 100 pods, ordinarily that system would schedule planning deployment of those pods serially. For such a large number of pods, processing each serially can result in significant system downtime. Determining an individual pod's resource requirements may take Oms while checking available host resources on 200 available hosts may take 10 ms each, for a total of 2000 ms or 2 s. Deploying that pod may take an additional 100 ms. This results in a 2.1 s planning time for an individual pod, and for 100 pods, this could result in a planning time of up to 210 s for a large group of pods. For systems at scale, this delay time quickly becomes significant.

To address this, a system according to the principles of the present disclosure may group or batch pod requests in sizes determinable by a user. Referring to the above example, a group of 100 pods may instead be grouped into two 50 pod batches. Determining the resource requirements for a first batch of 50 pods may still take Oms while determining the host resources for available hosts may also still take 2000 ms. Deploying each pod to an available host may still take 100 ms, up to 5 s for the 50 pods. This would result in a 7 s planning time for the first batch, and a 5 s time for the second batch since the host resource determination would only need to be performed once. The resultant 12 s planning time is a significant improvement over the 210 s planning time of a pod-by-pod planning. By determining available host resources on a batch basis rather than on a pod basis, pod planning and deployment time may be significantly reduced and result in greatly increased system performance.

Figure 1B:
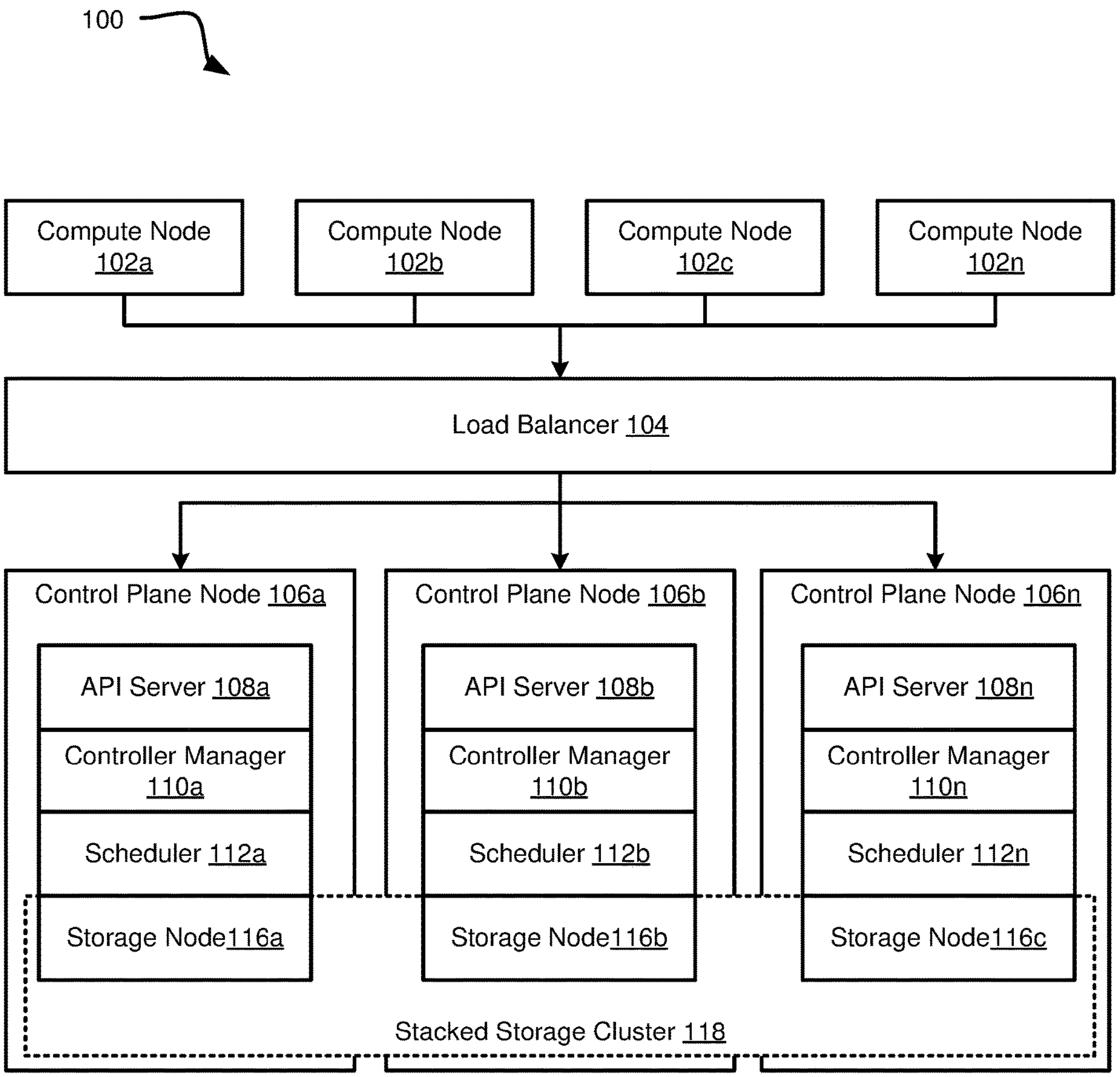
FIG. 1B is a schematic block diagram of a system for automated deployment, scaling, and management of containerized workloads and services, wherein the system draws on storage within a stacked storage cluster.

Referring now to the figures, FIGS. 1A and 1B are schematic illustrations of an example system 100 for automated deployment, scaling, and management of containerized workloads and services. The system 100 facilitates declarative configuration and automation . . . through a distributed platform that orchestrates different compute nodes that may be controlled by central master nodes. The system 100 may include "n" number of compute nodes that can be distributed to handle pods.

The system 100 includes a plurality of compute nodes 102*a*, 102*b*, 102*c*, 102*n* (may collectively be referred to as compute nodes 102 as discussed herein) that are managed by a load balancer 104. The load balancer 104 assigns processing resources from the compute nodes 102 to one or more of the control plane nodes 106*a*, 106*b*, 106*n* (may collectively be referred to as control plane nodes 106 as discussed herein) based on need. In the example implementation illustrated in FIG. 1A, the control plane nodes 106 draw upon a distributed shared storage 114 resource comprising a plurality of storage nodes 116*a*, 116*b* 116*c*, 116*d*, 116*n* (may collectively be referred to as storage nodes 116 as discussed herein). In the example implementation illustrated in FIG. 1B, the control plane nodes 106 draw upon assigned storage nodes 116 within a stacked storage cluster 118.

The control planes 106 make global decisions about each cluster and detect and responds to cluster events, such as initiating a pod when a deployment replica field is unsatisfied. The control plane node 106 components may be run on any machine within a cluster. Each of the control plane nodes 106 includes an API server 108, a controller manager 110, and a scheduler 112.

The API server 108 functions as the front end of the control plane node 106 and exposes an Application Program Interface (API) to access the control plane node 106 and the compute and storage resources managed by the control plane node 106. The API server 108 communicates with the storage nodes 116 spread across different clusters. The API server 108 may be configured to scale horizontally, such that it scales by deploying additional instances. Multiple instances of the API server 108 may be run to balance traffic between those instances.

The controller manager 110 embeds core control loops associated with the system 100. The controller manager 110 watches the shared state of a cluster through the API server 108 and makes changes attempting to move the current state of the cluster toward a desired state. The controller manager 110 may manage one or more of a replication controller, endpoint controller, namespace controller, or service accounts controller.

The scheduler 112 watches for newly created pods without an assigned node, and then selects a node for those pods to run on. The scheduler 112 accounts for individual and collective resource requirements, hardware constraints, software constraints, policy constraints, affinity specifications, anti-affinity specifications, data locality, inter-workload interference, and deadlines.

The storage nodes 116 function as a distributed storage resources with backend service discovery and database. The storage nodes 116 may be distributed across different physical or virtual machines. The storage nodes 116 monitor changes in clusters and store state and configuration data that may be accessed by a control plane node 106 or a cluster. The storage nodes 116 allow the system 100 to support discovery service so that deployed applications can declare their availability for inclusion in service.

In some implementations, the storage nodes 116 are organized according to a key-value store configuration, although the system 100 is not limited to this configuration. The storage nodes 116 may create a database page for each record such that the database pages do not hamper other records while updating one. The storage nodes 116 may collectively maintain two or more copies of data stored across all clusters on distributed machines.

Figure 2:
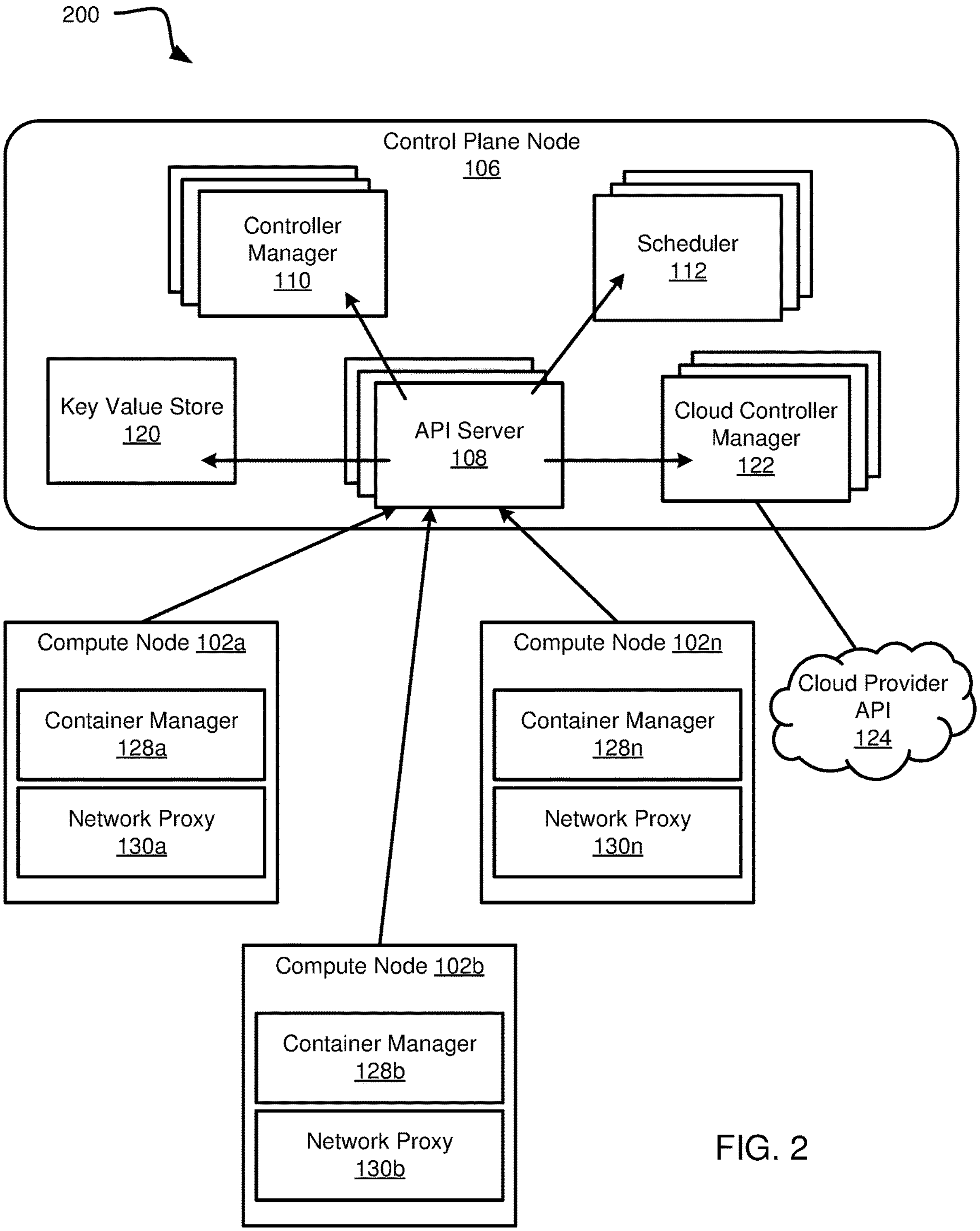
FIG. 2 is a schematic block diagram of a system for automated deployment, scaling, and management of containerized applications.

FIG. 2 is a schematic illustration of a cluster 200 for automating deployment, scaling, and management of containerized applications. The cluster 200 illustrated in FIG. 2 is implemented within the systems 100 illustrated in FIGS. 1A-1B, such that the control plane node 106 communicates with compute nodes 102 and storage nodes 116 as shown in FIGS. 1A-1B. The cluster 200 groups containers that make up an application into logical units for management and discovery.

The cluster 200 deploys a cluster of worker machines, identified as compute nodes 102*a*, 102*b*, 102*n*. The compute nodes 102*a*-102*n* run containerized applications, and each cluster has at least one node. The compute nodes 102*a*-102*n* host pods that are components of an application workload. The compute nodes 102*a*-102*n* may be implemented as virtual or physical machines, depending on the cluster. The cluster 200 includes a control plane node 106 that manages compute nodes 102*a*-102*n* and pods within a cluster. In a production environment, the control plane node 106 typically manages multiple computers and a cluster runs multiple nodes. This provides fault tolerance and high availability.

The key value store 120 is a consistent and available key value store used as a backing store for cluster data. The controller manager 110 manages and runs controller processes. Logically, each controller is a separate process, but to reduce complexity in the cluster 200, all controller processes are compiled into a single binary and run in a single process. The controller manager 110 may include one or more of a node controller, job controller, endpoint slice controller, or service account controller.

The cloud controller manager 122 embeds cloud-specific control logic. The cloud controller manager 122 enables clustering into a cloud provider API 124 and separates components that interact with the cloud platform from components that only interact with the cluster. The cloud controller manager 122 may combine several logically independent control loops into a single binary that runs as a-single process. The cloud controller manager 122 may be scaled horizontally to improve performance or help tolerate failures.

The control plane node 106 manages any number of compute nodes 126. In the example implementation illustrated in FIG. 2, the control plane node 106 is managing three nodes, including a first node 126*a*, a second node 126*b*, and an nth node 126*n* (which may collectively be referred to as compute nodes 126 as discussed herein). The compute nodes 126 each include a container manager 128 and a network proxy 130.

The container manager 128 is an agent that runs on each compute node 126 within the cluster managed by the control plane node 106. The container manager 128 ensures that containers are running in a pod. The container manager 128 may take a set of specifications for the pod that are provided through various mechanisms, and then ensure those specifications are running and healthy.

The network proxy 130 runs on each compute node 126 within the cluster managed by the control plane node 106. The network proxy 130 maintains network rules on the compute nodes 126 and allows network communication to the pods from network sessions inside or outside the cluster.

Figure 3:
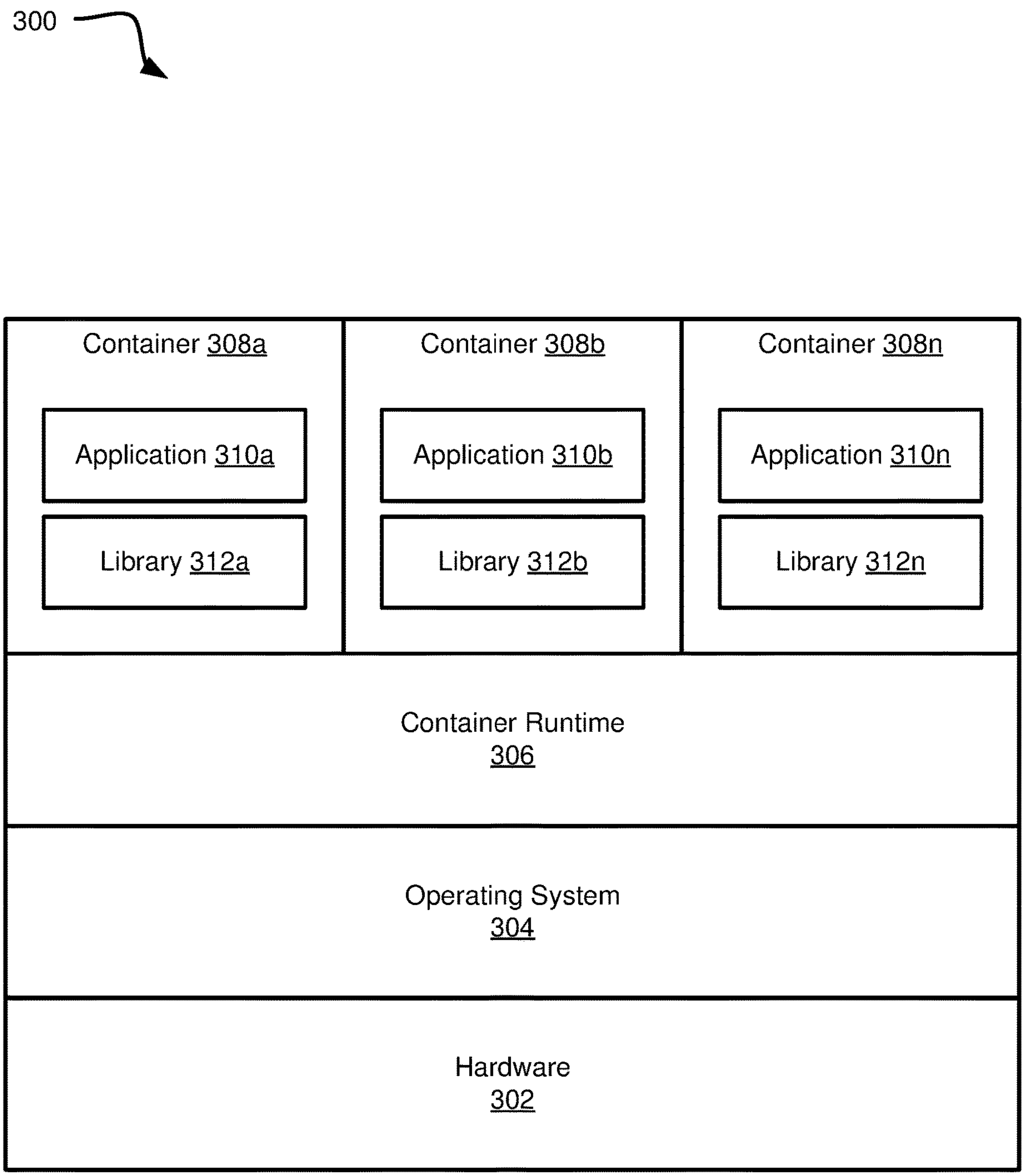
FIG. 3 is a schematic block diagram illustrating a system for managing containerized workloads and services.

FIG. 3 is a schematic diagram illustrating a system 300 for managing containerized workloads and services. The system 300 includes hardware 302 that supports an operating system 304 and further includes a container runtime 306, which refers to the software responsible for running containers 308. The hardware 302 provides processing and storage resources for a plurality of containers 308*a*, 308*b*, 308*n* that each run an application 310 based on a library 312. The system 300 discussed in connection with FIG. 3 is implemented within the systems 100, 200 described in connection with FIGS. 1A-1B and 2.

The containers 308 function similar to a virtual machine but have relaxed isolation properties and share an operating system 304 across multiple applications 310. Therefore, the containers 308 are considered lightweight. Similar to a virtual machine, a container has its own file systems, share of CPU, memory, process space, and so forth. The containers 308 are decoupled from the underlying instruction and are portable across clouds and operating system distributions. Containers 308 are repeatable and may decouple applications from underlying host infrastructure. This makes deployment easier in different cloud or OS environments. A container image is a ready-to-run software package, containing everything needed to run an application, including the code and any runtime it requires, application and system libraries, and default values for essential settings. By design, a container 308 is immutable such that the code of a container 308 cannot be changed after the container 308 begins running.

The containers 308 enable certain benefits within the system. Specifically, the containers 308 enable agile application creation and deployment with increased ease and efficiency of container image creation when compared to virtual machine image use. Additionally, the containers 308 enable continuous development, integration, and deployment by providing for reliable and frequent container image build and deployment with efficient rollbacks due to image immutability. The containers 308 enable separation of development and operations by creating an application container at release time rather than deployment time, thereby decoupling applications from infrastructure. The containers 308 increase observability at the operating system-level, and also regarding application health and other signals. The containers 308 enable environmental consistency across development, testing, and production, such that the applications 310 run the same on a laptop as they do in the cloud. Additionally, the containers 308 enable improved resource isolation with predictable application 310 performance. The containers 308 further enable improved resource utilization with high efficiency and density.

The containers 308 enable application-centric management and raise the level of abstraction from running an operating system 304 on virtual hardware to running an application 310 on an operating system 304 using logical resources. The containers 304 are loosely coupled, distributed, elastic, liberated micro-services. Thus, the applications 310 are broken into smaller, independent pieces and can be deployed and managed dynamically, rather than a monolithic stack running on a single-purpose machine.

The containers 308 may include any container technology known in the art such as DOCKER, LXC, LCS, KVM, or the like. In a particular application bundle 406, there may be containers 308 of multiple distinct types in order to take advantage of a particular container's capabilities to execute a particular role 416. For example, one role 416 of an application bundle 406 may execute a DOCKER container 308 and another role 416 of the same application bundle 406 may execute an LCS container 308.

The system 300 allows users to bundle and run applications 310. In a production environment, users may manage containers 308 and run the applications to ensure there is no downtime. For example, if a singular container 308 goes down, another container 308 will start. This is managed by the control plane nodes 106, which oversee scaling and failover for the applications 310.

Figure 4:
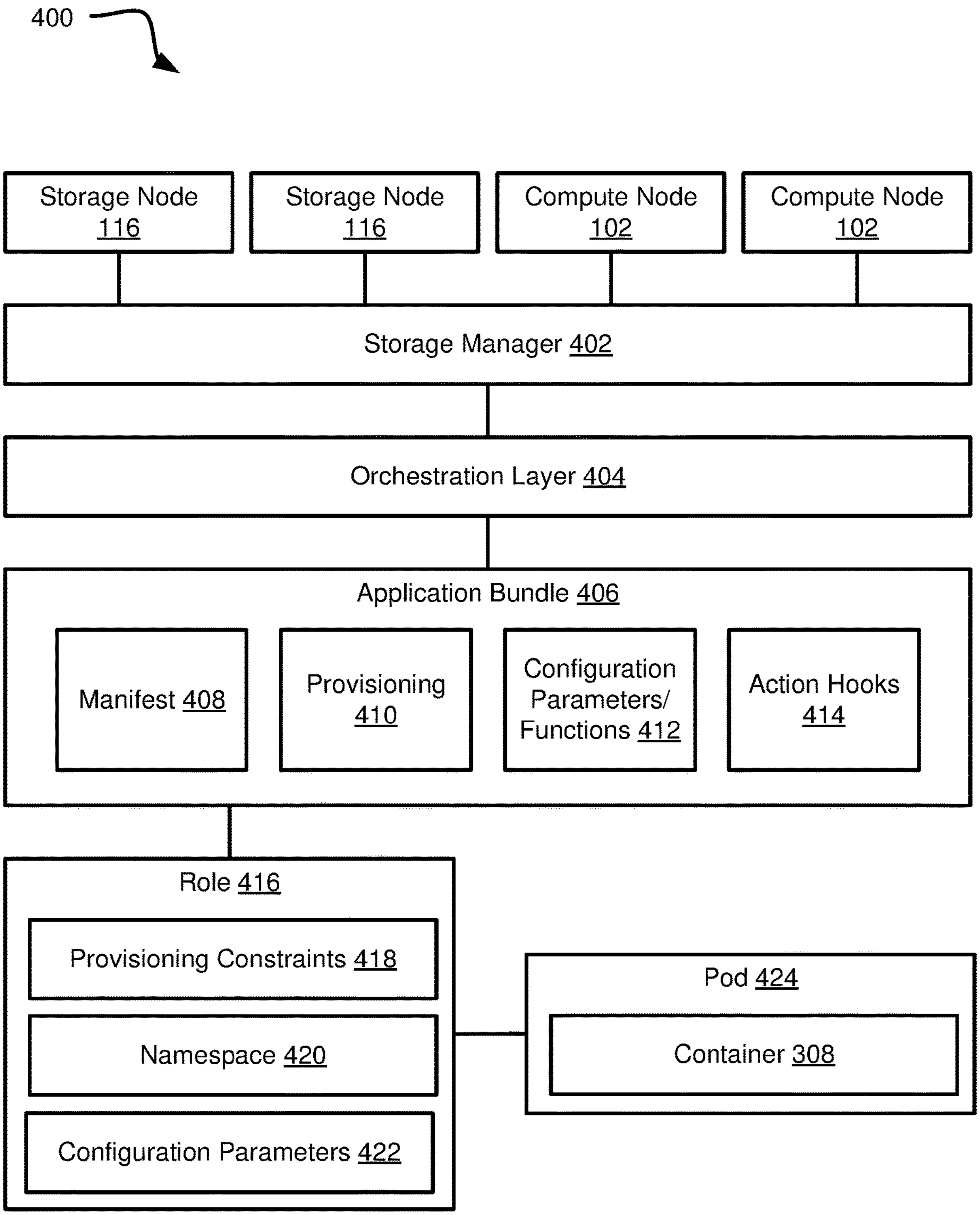
FIG. 4 is a schematic block diagram illustrating a system for implementing an application-orchestration approach to data management and allocation of processing resources.

FIG. 4 is a schematic diagram of an example system 400 implementing an application-orchestration approach to data management and the allocation of processing resources. The system 400 includes an orchestration layer 404 that implements an application bundle 406 including one or more roles 416. The role 416 may include a standalone application, such as a database, webserver, blogging application, or any other application. Examples of roles 416 include the roles used to implement multi-role applications such as CASSANDRA, HADOOP, SPARK, DRUID, SQL database, ORACLE database, MONGODB database, WORDPRESS, and the like. For example, in HADOOP, roles 416 may include one or more of a named node, data node, zookeeper, and AMBARI server.

The orchestration layer 404 implements an application bundle 406 by defining roles 416 and relationships between roles 416. The orchestration layer 404 may execute on a computing device of a distributed computing system (see, e.g., the systems illustrated in FIGS. 1A-1B and 2-3), such as on a compute node 102, storage node 116, a computing device executing the functions of the control plane node 106, or some other computing device. Accordingly, actions performed by the orchestration layer 404 may be interpreted as being performed by the computing device executing the orchestration layer 404.

The application bundle 406 includes a manifest 408 and artifacts describing an application. The application bundle 406 itself does not take any actions. When the application bundle 406 is deployed by compute resources, the application bundle 406 is then referred to as a "bundle application." This is discussed in connection with FIG. 6, which illustrates deployment of the application bundle 406 to generate a bundle application 606 comprising one or more pods 424 and containers 308 run on compute nodes 102 within a cluster 200.

The application bundle 406 includes a manifest 408 that defines the roles 416 of the application bundle 406, which may include identifiers of roles 416 and possibly a number of instances for each role 416 identified. The manifest 408 defines dynamic functions based on the number of instances of a particular role 416, which may grow or shrink in real-time based on usage. The orchestration layer 404 creates or removes instances for a role 416 as described below as indicated by usage and one or more functions for that role 416. The manifest 408 defines a topology of the application bundle 406, which includes the relationships between roles 416, such as services of a role that are accessed by another role.

The application bundle 406 includes a provisioning component 410. The provisioning component 410 defines the resources of storage nodes 116 and compute nodes 102 required to implement the application bundle 406. The provisioning component 410 defines the resources for the application bundle 406 as a whole or for individual roles 416. The resources may include a number of processors (e.g., processing cores), an amount of memory (e.g., RAM (random access memory), an amount of storage (e.g., GB (gigabytes) on an HDD (Hard Disk Drive) or SSD (Solid State Drive)), and so forth. As described below, these resources may be provisioned in a virtualized manner such that the application bundle 406 and individual roles 416 are not informed of the actual location or processing and storage resources and are relieved from any responsibility for managing such resources.

The provisioning component 410 implements static specification of resources and may also implement dynamic provisioning functions that invoke allocation of resources in response to usage of the application bundle 406. For example, as a database fills up, additional storage volumes may be allocated. As usage of an application bundle 406 increases, additional processing cores and memory may be allocated to reduce latency.

The application bundle 406 may include configuration parameters 412. The configuration parameters include variables and settings for each role 416 of the application bundle 406. The developer of the role defines the configuration parameters 416 and therefore may include any example of such parameters for any application known in the art. The configuration parameters may be dynamic or static. For example, some parameters may be dependent on resources such as an amount of memory, processing cores, or storage. Accordingly, these parameters may be defined as a function of these resources. The orchestration layer will then update such parameters according to the function in response to changes in provisioning of those resources that are inputs to the function.

The application bundle 406 may further include action hooks 414 for various life cycle actions that may be taken with respect to the application bundle 406 and/or particular roles 416 of the application bundle 406. Actions may include some or all of stopping, starting, restarting, taking snapshots, cloning, and rolling back to a prior snapshot. For each action, one or more action hooks 414 may be defined. An action hook 414 is a programmable routine that is executed by the orchestration layer 404 when the corresponding action is invoked. The action hook 414 may specify a script of commands or configuration parameters input to one or more roles 416 in a particular order. The action hooks 414 for an action may include a pre-action hook (executed prior to implementing an action), an action hook (executed to actually implement the action), and a post action hook (executed following implementation of the action).

The application bundle 406 defines one or more roles 416. Each role 416 may include one or more provisioning constraints. As noted above, the application bundle 406 and the roles 416 are not aware of the underlying storage nodes 106 and compute nodes 116 inasmuch as these are virtualized by the storage manager 402 and orchestration layer 404. Accordingly, any constraints on allocation of hardware resources may be included in the provisioning constraints 410. As described in greater detail below, this may include constraints to create separate fault domains in order to implement redundancy and constraints on latency.

The role 416 references the namespace 420 defined by the application bundle 406. All pods 424 associated with the application bundle 406 are deployed in the same namespace 420. The namespace 420 includes deployed resources like pods, services, configmaps, daemonsets, and others specified by the role 416. In particular, interfaces and services exposed by a role may be included in the namespace 420. The namespace 420 may be referenced through the orchestration layer 404 by an addressing scheme, e.g., <Bundle ID>.<Role ID>.<Name>. In some embodiments, references to the namespace 420 of another role 416 may be formatted and processed according to the JINJA template engine or some other syntax. Accordingly, each role 416 may access the resources in the namespace 420 in order to implement a complex application topology.

A role 416 may further include various configuration parameters 422 defined by the role, i.e., as defined by the developer that created the executable for the role 416. As noted above, these parameters may be set by the orchestration layer 404 according to the static or dynamic configuration parameters 422. Configuration parameters 422 may also be referenced in the namespace 420 and be accessible (for reading and/or writing) by other roles 416.

Each role 416 within the application bundle 406 maps to a pod 424. Each of the one or more pods 424 includes one or more containers 308. Each resource allocated to the application bundle 406 is mapped to the same namespace 420.

The pods 424 are the smallest deployable units of computing that may be created and managed in the systems described herein. The pods 424 constitute groups of one or more containers 308, with shared storage and network resources, and a specification of how to run the containers 308. The pods' 502 containers are co-located and co-scheduled and run in a shared context. The pods 424 are modeled on an application-specific "logical host," i.e., the pods 424 include one or more application containers 308 that are relatively tightly coupled. In non-cloud contexts, application bundles 406 executed on the same physical or virtual machine are analogous to cloud applications executed on the same logical host.

The pods 424 are designed to support multiple cooperating processes (as containers 308) that form a cohesive unit of service. The containers 308 in a pod 424 are co-located and co-scheduled on the same physical or virtual machine in the cluster. The containers 308 can share resources and dependencies, communicate with one another, and coordinate when and how they are terminated. The pods 424 may be designed as relatively ephemeral, disposable entities. When a pod 424 is created, the new pod 424 is schedule to run on a node in the cluster. The pod 424 remains on that node until the pod 424 finishes executing, and then the pod 424 is deleted, evicted for lack of resources, or the node fails.

In some implementations, the shared context of a pod 424 is a set of Linux® namespaces, cgroups, and potentially other facets of isolation, which are the same components of a container 308. The pods 424 are similar to a set of containers 308 with shared filesystem volumes. The pods 424 can specify a set of shared storage volumes. All containers 308 in the pod 424 can access the shared volumes, which allows those containers 308 to share data. Volumes allow persistent data in a pod 424 to survive in case one of the containers 308 within needs to be restarted.

In some cases, each pod 424 is assigned a unique IP address for each address family. Every container 308 in a pod 424 shares the network namespace, including the IP address and network ports. Inside a pod 424, the containers that belong to the pod 424 can communicate with one another using localhost. When containers 308 in a pod 424 communicate with entities outside the pod 424, they must coordinate how they use the shared network resources. Within a pod 424, containers share an IP address and port space, and can find each other via localhost. The containers 308 in a pod 424 can also communicate with each other using standard inter-process communications.

Figure 5:
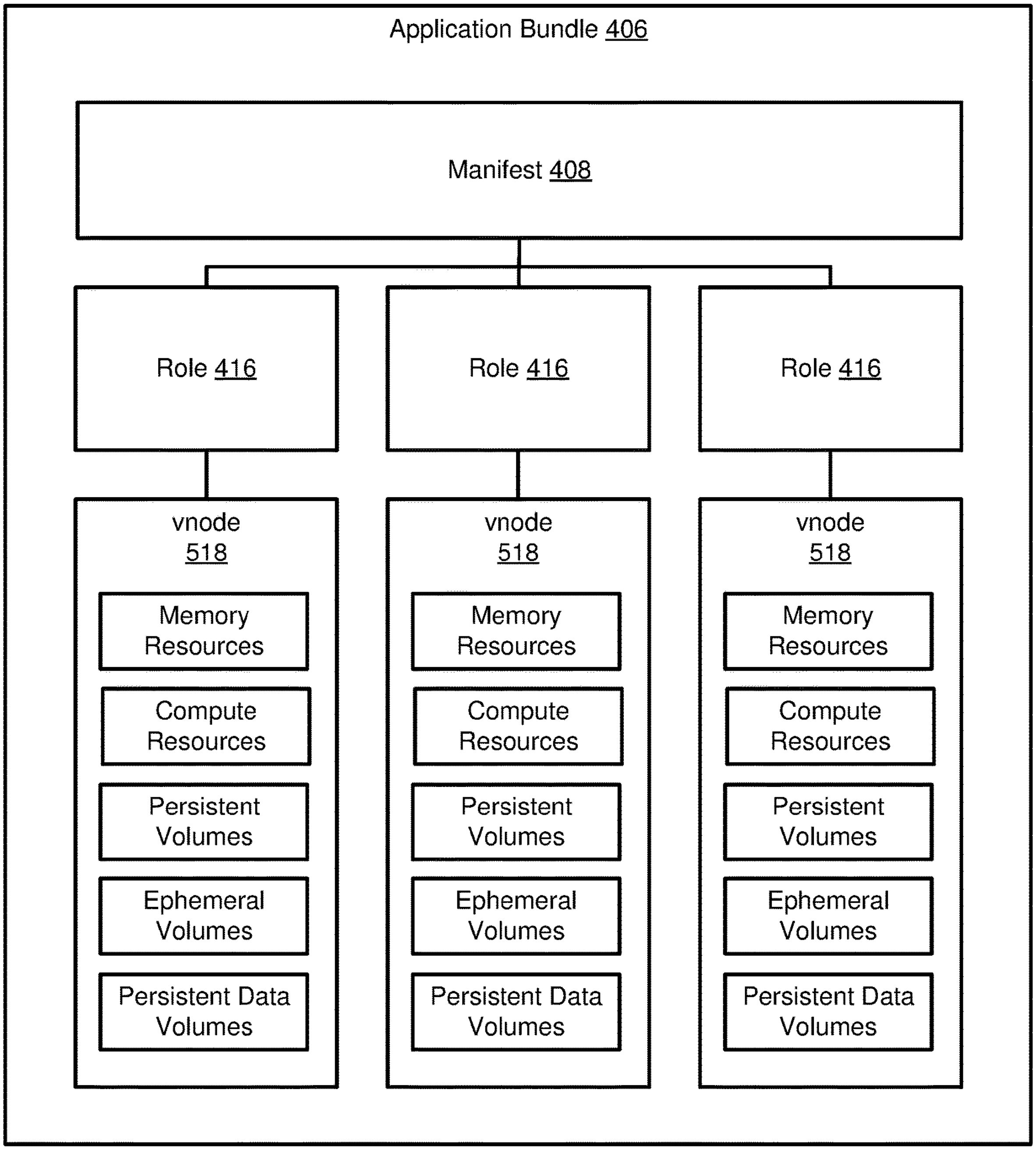
FIG. 5 is a schematic block diagram illustrating an example application bundle.

FIG. 5 is a schematic illustration of an example application bundle 406 that may be executed by the systems described herein. The application bundle 406 is a collection of artifacts required to deploy and manage an application. The application bundle 406 includes one or more application container images referenced within a manifest 408 file that describes the components of its corresponding application bundle 406. The manifest 408 file further defines the necessary dependencies between services, resource requirements, affinity and non-affinity rules, and custom actions required for application management. As a result, a user may view the application bundle 406 as the starting point for creating an application within the systems described herein.

The application bundle 406 includes the manifest 408 file, and further optionally includes one or more of an icons directory, scripts directory, and source directory. The manifest 408 file may be implemented as a YAML file that acts as the blueprint for an application. The manifest 408 file describes the application components, dependencies, resource requirements, hookscripts, execution order, and so forth for the application. The icons directory includes application icons, and if no icon is provided, then a default image may be associated with the application bundle 406. The scripts directory includes scripts that need to be run during different stages of the application deployment. The scripts directory additionally includes lifecycle management for the application.

The example application bundle 406 illustrated in FIG. 5 includes a plurality of roles 416, but it should be appreciated that the application bundle 406 may have any number of roles 416, including one or more roles 416 as needed depending on the implementation. Each role 416 defines one or more vnodes 518. Each vnode 518 specifies container 308 resources for the corresponding role 416: The container resources include one or more of memory resources, compute resources, persistent volumes, persistent data volumes, and ephemeral data volumes. When the application bundle 406 is deployed in a cluster such as the cluster 200 illustrated in FIG. 2, each role 416 maps to a pod 424 and each vnode 518 maps to a container 308.

The manifest 408 file has several attributes that can be used to manipulate aspects of a container 308, including the compute node 102 resources and storage node 116 resources allocated to the containers 308, which containers 308 are spawned, and so forth. The application bundle 406 enables user to specify image and runtime engine options for each role 416. These options may include, for example name (name of the image), version (version of the image), and engine (type of runtime such as DOCKER, KVM, IXC, and so forth).

The manifest 408 file allocates compute resources such as memory, CPU, hugepages, GPU, and so forth, at the container 308 level. A user may specify the type of CPUs that should be picked, and may further specify options such as Non-Isolated, Isolated-Shared, and Isolated-Dedication. The Non-Isolated option indicates that the physical CPUs to be used for a deployment of the application bundle 406 should be from a non-isolated pool of CPUs on a host. The Isolated-Shared option indicates that the physical CPUs to be used for a deployment of the application bundle 406 should be from an isolated pool of CPUS on the host. With this option, even though the allocated CPUs are isolated from kernel processes, they can still be utilized by other application deployments. The Isolated-Dedicated option indicates that the physical CPUs to be used for a deployment of the application bundle 406 should be from an isolated pool of CPUs on the host. With this option, the allocated CPUs are isolated from kernel processes and other application deployments. The manifest 408 file further allocates storage resources at the container 308 level.

Figure 6:
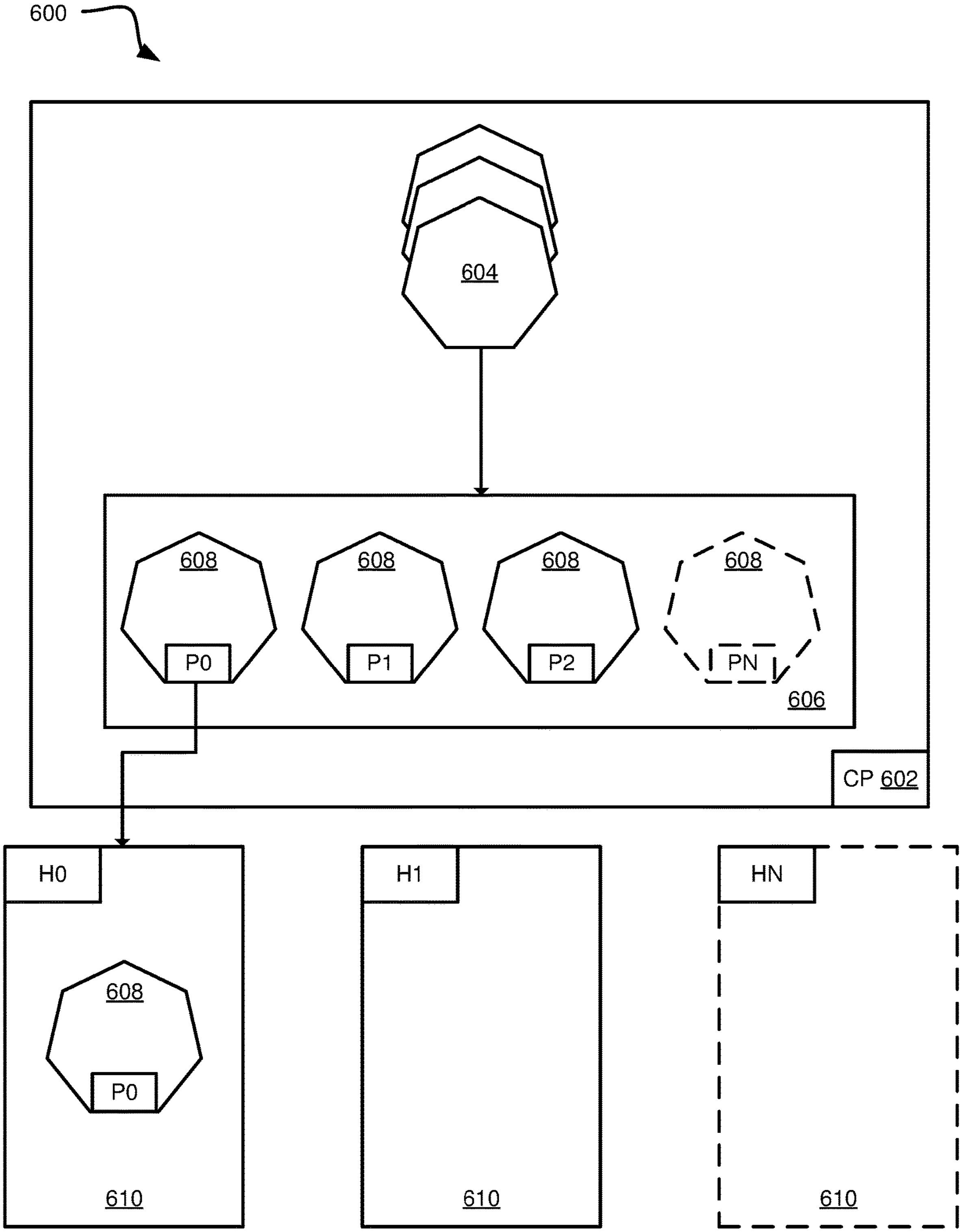
FIG. 6 shows a schematic diagram of an overview of a pod request batching system.

FIG. 6 shows a schematic diagram of a system 600 intaking pod requests 604, organizing those pod requests 604 into a batch 606, and distributing the pods 608, or applications, to hosts 610. The system may include a plurality of pod requests 604 as input then group those requests into one or more batches 606. A user may specify how the batching is performed. In some implementations a user may set a specific number by which the pods 608 are batched like, for example, fifty pods 608 to a batch 606. In other implementations a user may choose to have the scheduler on the control plane 602 wait for a group of pod requests 604 then split that group into parts to form batches 606. In yet other implementations a user may choose to define a time period during which pod requests 604 are accepted, and at the end of that period group the collected pod requests 604 into a batch 606, then begin the next time period. Those skilled in the art will appreciate other configurations of forming batches are possible.

Once batched, the scheduler on the control plane 602 may calculate the compute resources required for each pod request 608 within the batch 606 and determine the host resources available on one or more hosts 610 within the system. Pods 608 may be uniform in their compute resource requirements in some implementations while in others each pod request 608 may have separate requirements. After calculation, the scheduler on the control plane 602 may begin distributing the pod requests 608 to available hosts 610. How the pod requests 608 are deployed and which hosts 610 those pod requests 608 are deployed to may be configured according to user specification. Depending on the availability of resources and user configuration, one or more pods 608 may be sent to any of the available hosts.

Figure 7:
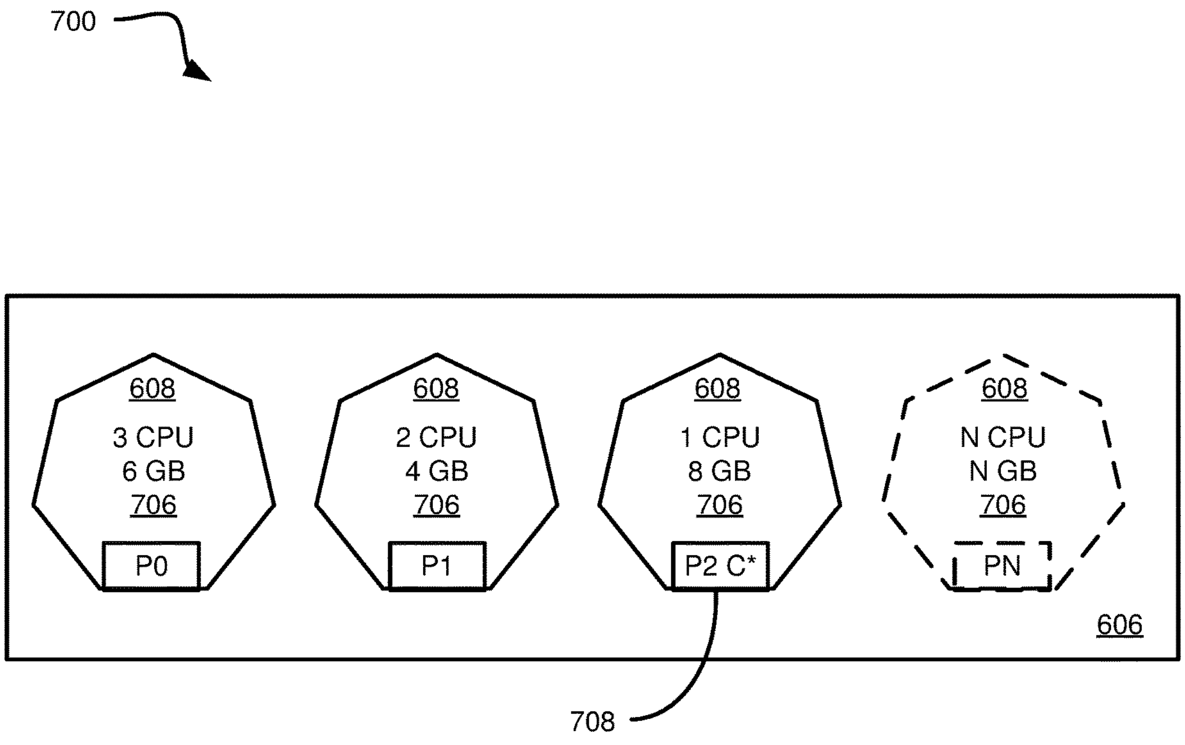
FIG. 7 shows a schematic diagram of a pod request batch.

FIG. 7 shows a schematic diagram of an overview 700 of a pod request batch 606. A batch may comprise a plurality of pod requests 608, with the maximum number of pod requests 608 within a batch being definable by a user. Pod requests 608 may have specific compute resource requirements 706 indicating the amount or number of resources necessary for the pod requests 608 to perform whatever function each pod request 608 is intended to perform. In some implementations resource requirements 706 may indicate an average of expected resources, a maximum the pod request 608 may need, a minimum amount required, or other specification of expected resource usage. A user may configure require requirements 706 to fit their needs within a system and how a control plane 602 distributes pod requests 608 according to those resource requirements 706. Pod requests 608 may additionally have annotations 708 further characterizing each pod request 608. The annotations 708 may comprise metadata and may indicate a number of a pod request 608 within a batch 606, a user-defined status of a pod request 608, or other features a user may wish to indicate. In FIG. 7, each pod request 608 is labeled with exemplary resource requirements 706 and exemplary number annotations 708. A batch 606 may be sized to accommodate any number of pod requests 608 according to a user's needs. Here, exemplary pod requests 608 are counted ranging from a first pod request 608 labeled P0 up to PN, where N may be any number according to how many pod requests 608 a user sees fit to include in a given batch 606. Pod request P2 has an additional exemplary annotation 708 indicating a criticality status. A user may choose to indicate that a particular pod request is higher or lower priority, influencing the order in which pod request requests within a batch are distributed. Higher priority pod requests may be indicated as "critical" or some other status connoting importance and these higher priority pod requests may be distributed prior to other pod requests within the batch.

The system may be able to enforce multiple placement policies, or specifications or configurations describing how the system may organize and deploy pod requests to create pods on available hosts. These policies may give users additional control over the placement of pod requests, affinity rules, etc. for their deployment. Additionally, these placement policies can be applied independently on each service or role within a pod request or applied to a pod after pod deployment. This control may help optimize application performance, cluster utilization, and allow a user to customize their pod request deployment based on their cluster configuration. These placement policies may be defined by a user to enforce placement or sorting according to user defined algorithms, policies or rules describing what pods may be placed on a particular host, or other ways of selectively sorting the pod requests to the hosts. Algorithms, rules, policies, or other types of rule enforcement may be applied to pod requests or hosts or both and may be customized to suit a user's needs for their system.

Figure 8:
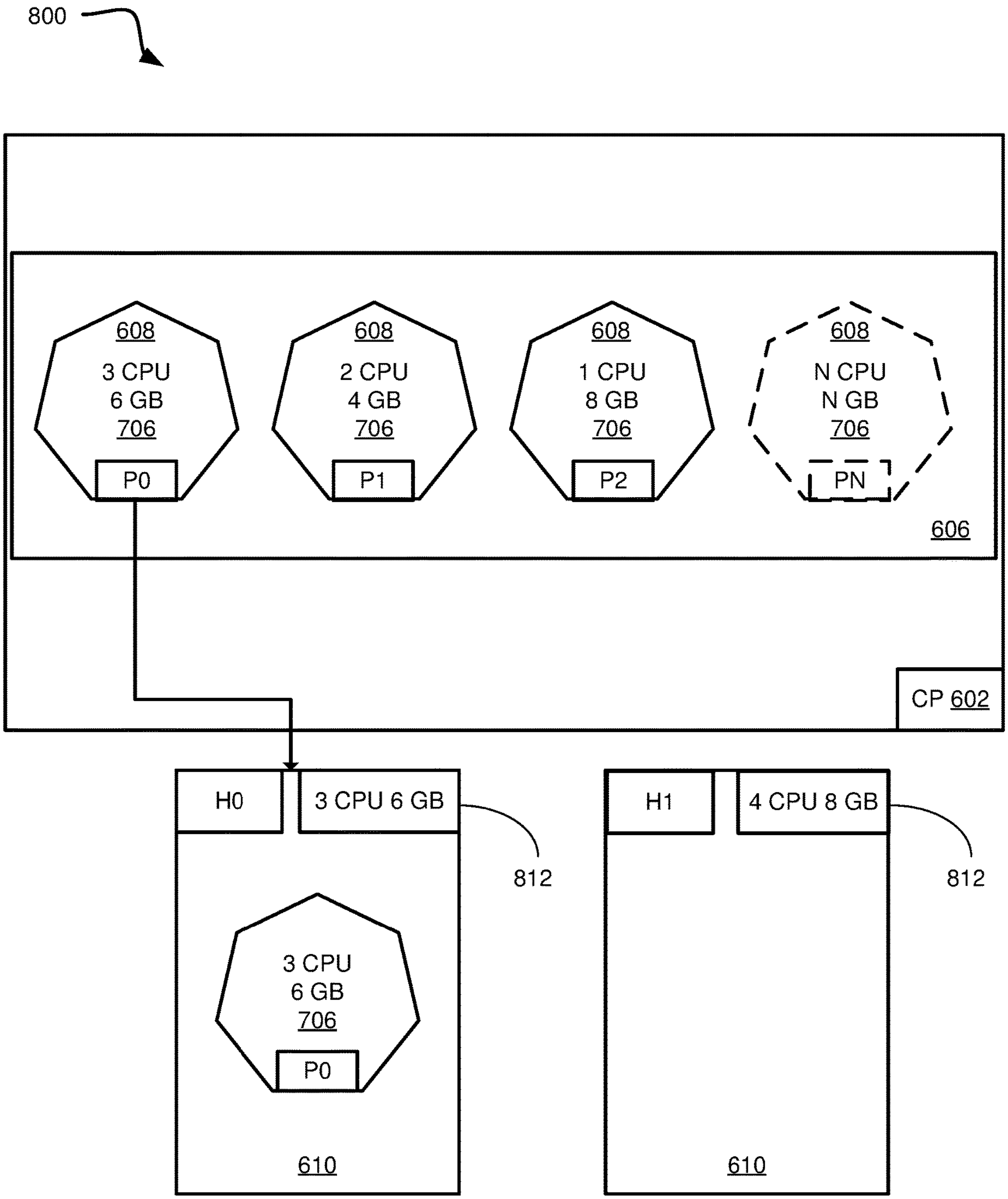
FIG. 8 shows a schematic diagram of a pod request batch sorting according to a best-fit algorithm.
Figure 9:
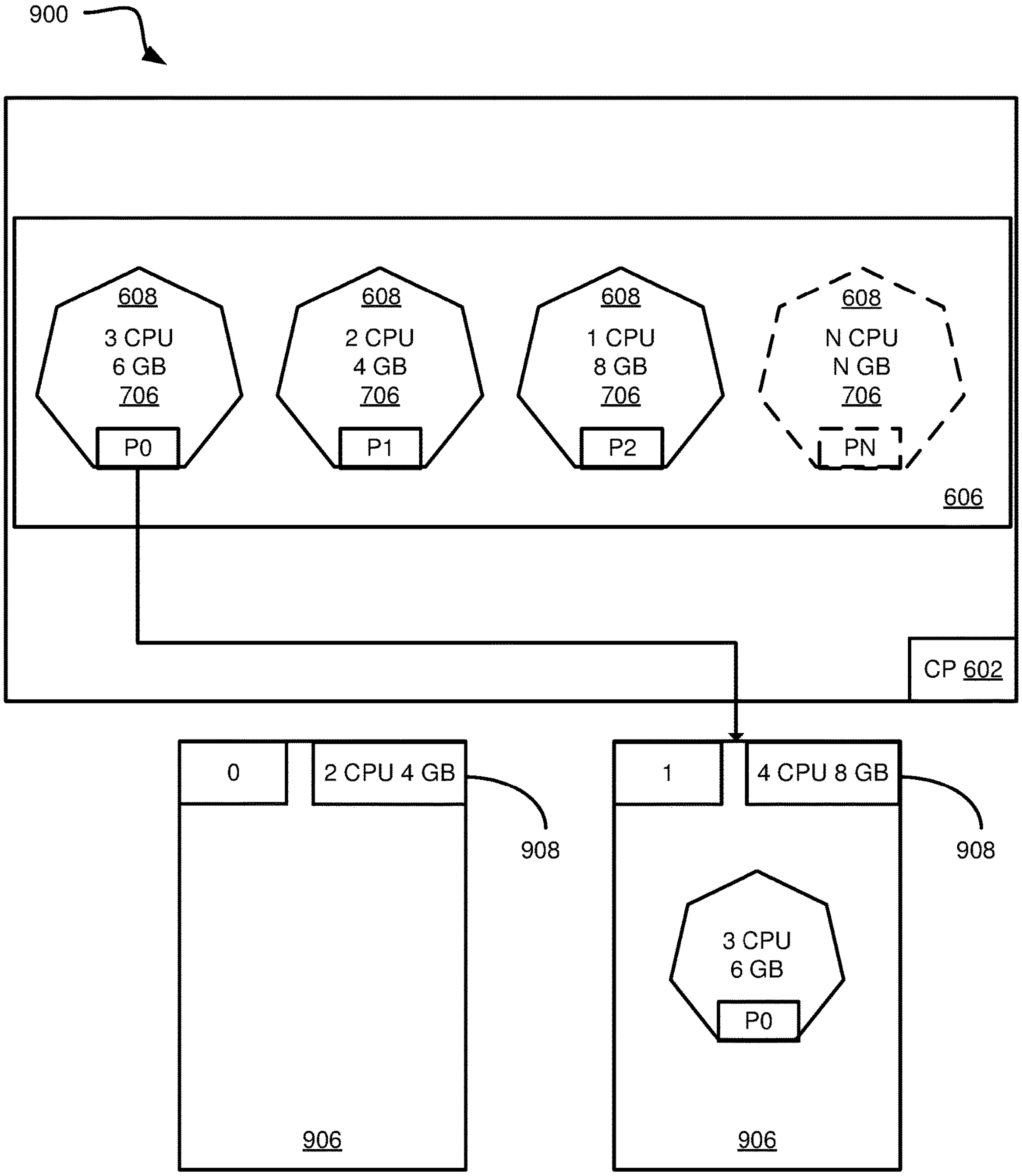
FIG. 9 shows a schematic diagram of a pod request batch sorting according to a first-fit algorithm.

FIG. 8 shows a schematic diagram of an overview 800 of a batch 606 of pod requests 608 being distributed to hosts 610 according to an exemplary best-fit algorithm. After compute resource requirements 706 of pod requests 608 within a batch 606 and availability status and availability of resources 812 of hosts 610 are calculated, pod requests 608 may be sorted according to a user-defined algorithm. Host 610 status may entail a determination of whether that particular host is online and/or has resources available to accept deployed pods. Host 610 resource availability may include a determination of whether there are sufficient available storage and/or compute resources to accommodate pod deployment. In FIG. 8, pod requests 608 are sorted according to an exemplary "best-fit" algorithm. In such a scenario, the scheduler on the control plane 602 may attempt to sort pod requests 608 to hosts 610 such that the compute requirements 706 of the pod request 608 and the available host 610 host resources 812 match. Here, exemplary pod request 608 P0 is deployed to exemplary host H0. The resource requirements 706 of P0 and the available host resources 812 on H0 batch, and thus P0 is a best fit for H0. A system may scale to accommodate any number of hosts according to a system's needs, and specific numbering of hosts are intended to be exemplary and non-limiting. This type of distribution may be selected in instances where a user may want to optimize resource distribution between pod request 608 and hosts 610. In other implementations a user may be less concerned with optimization and instead opt for a distribution which simply deploys pod requests 608 as quickly as possible. In this situation, as shown in FIG. 9, a user may utilize a "first-fit" algorithm by which the scheduler on the control plane 602 may deploy a pod request 608 to the first available host 906 with sufficient host resources 908 to support the pod request 608. Shown in FIG. 9, the exemplary first possible available host 906, H0, has insufficient host resources 908 available to support the resource requirements 706 of exemplary pod request 608 P0. P0 is then deployed to exemplary available host 906 H1. While H1 has resources 908 in excess of P0's resource requirements 706, it does have enough to support P0, and thus it is the first available fit for P0. The next pod request 608 in line, P1, may then be deployed to H0, because H0 is the first available host in which P1's resource requirements 706 match the host's 906 available host resources 908.

Figure 10:
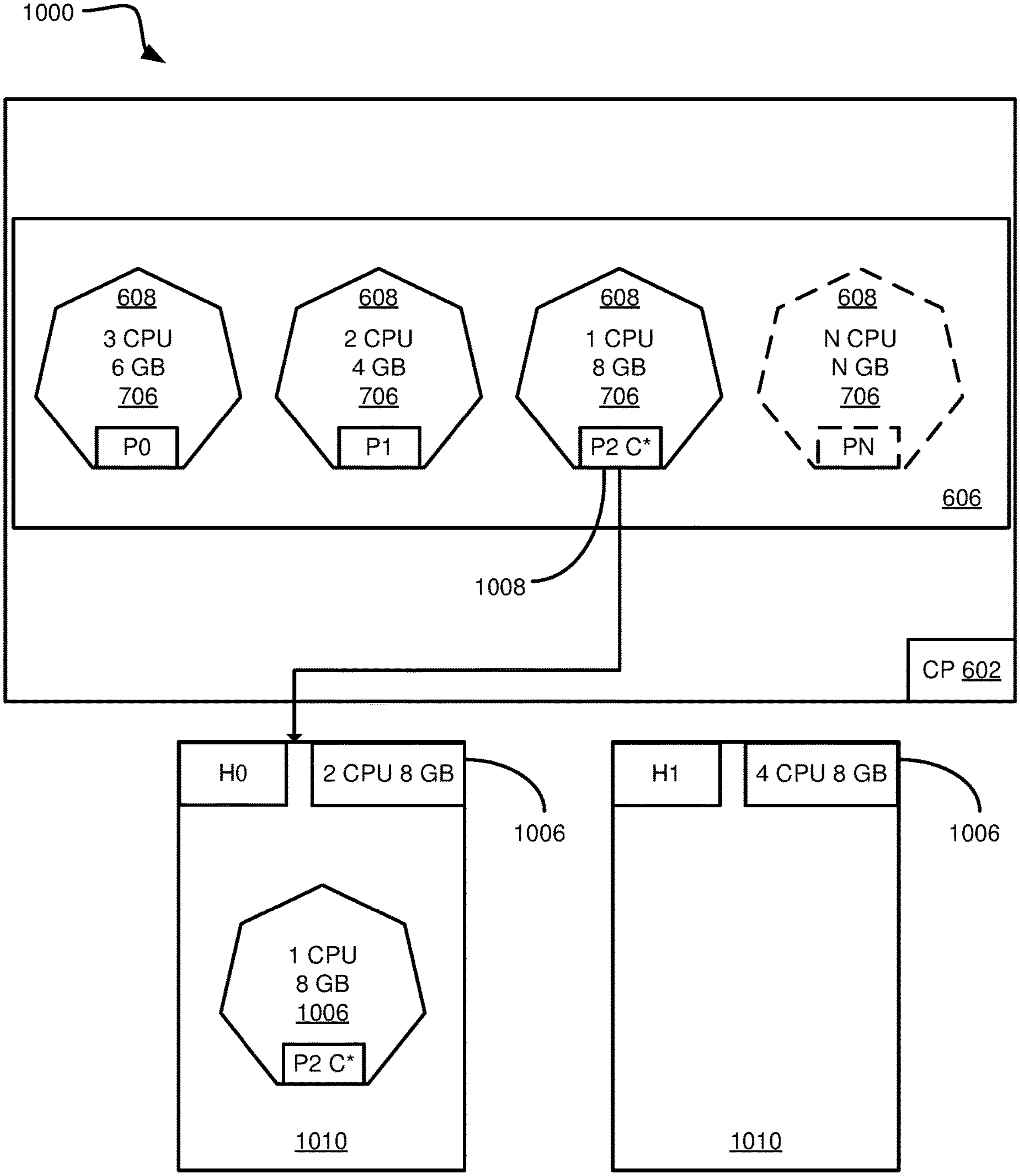
FIG. 10 shows a schematic diagram of a pod request batch sorting according to a tag indicating a critical status of a pod.

FIG. 10 shows a schematic diagram of a batch 606 of pod requests 608 sorting according to user-defined annotations 1008. In some implementations a user may include metadata tags with pod requests to annotate the batched pod requests 608. These annotations may indicate a number of different characteristics of a pod request 608 that a user may want to influence the deployment of that pod request 608. In FIG. 10, exemplary pod request P2 has an exemplary annotation "C*" indicating that the pod request 608 is of a critical status. This annotation may indicate that the scheduler on the control plane 602 should prioritize this pod request 608 when deploying pod requests 608 to available hosts 1010. Even though P2 is not the first in line within the batch 606, because it is indicated by annotation 1008 as having a critical status and thus is of a higher priority, it is the first pod request 608 the batch 606 to be deployed to an available host 1010. Criticality and other user-defined statuses may be configured however a user sees fit. In some implementations, critical status and other priority levels may be defined by the resource needs 706 of a pod request 608. A critical, or high priority, pod request 608 may be one in which the resource requirements 706 of the pod request 608 and the expected resource usage of the pod may be very close.

Once deployed, a pod may consume more or less resources than it is initially indicated to require. A resource requirement 706 may be an exact requirement, an estimated average, a user-specified amount, or may be determined in some other manner. A medium priority pod request, then, may be a pod in which a maximum resource requirement 706 is specified, but with no minimum specified. A low priority pod may be one in which there is no minimum or maximum resource requirement specified, and the scheduler on the control plane 602 may need to find a host 1010 with a surplus of host resources 1006 to accommodate the pod. Priority levels may be configured to include more or less levels than what has been described above, and the standard by which the system judges priority may be tailored to suit the user's needs. A user may additionally define other annotations 1008 to tag and sort pods according to the user's needs.

Figure 11:
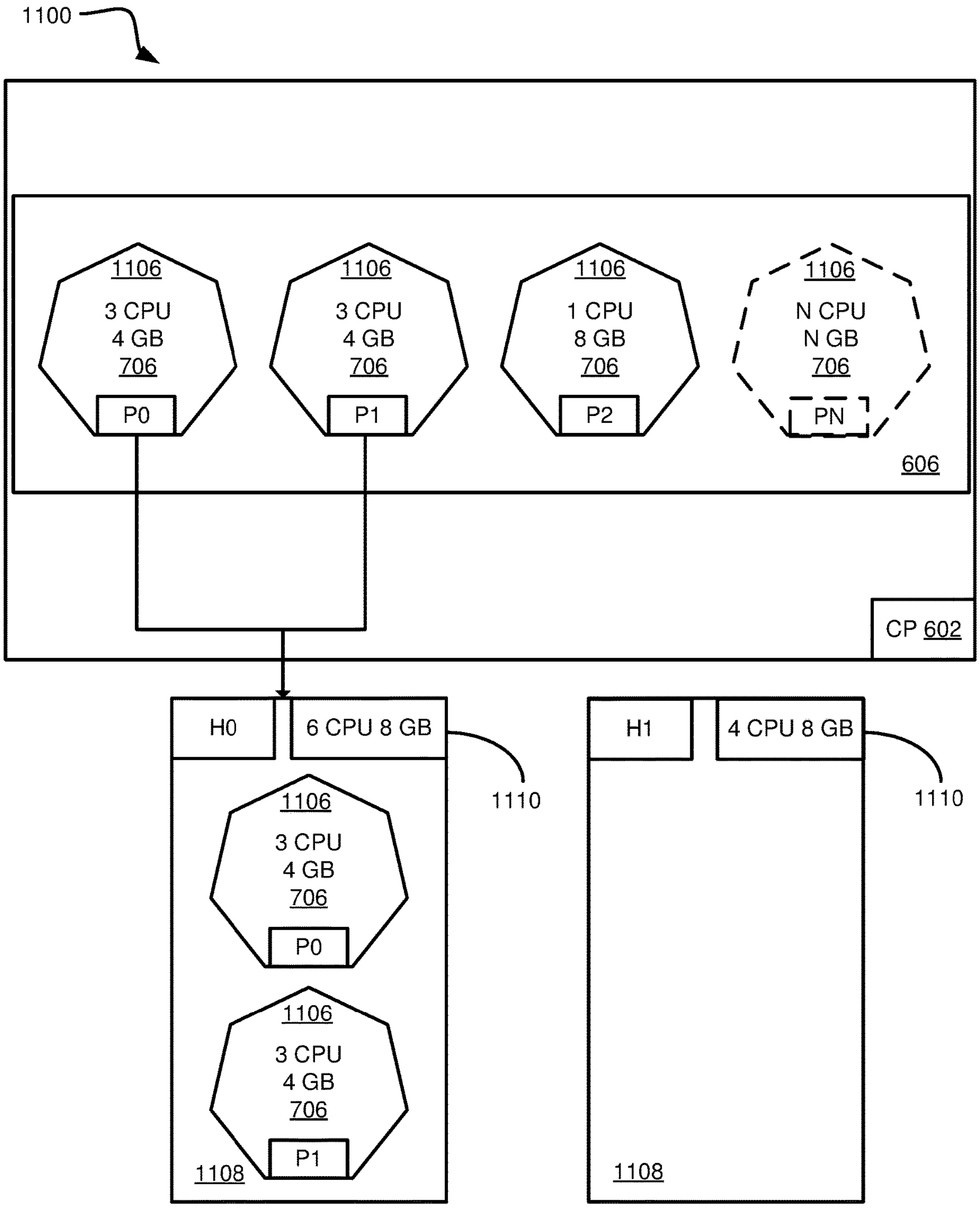
FIG. 11 shows a schematic diagram of a pod request batch sorting multiple pods to a same host.

FIG. 11 shows a schematic diagram of an overview 1100 of a batch 606 of another set of pod requests 1106 and sorting multiple pod requests 1106 to a same available host 1108. In some implementations a user may want pod requests 1106 deployed to available hosts 1108 in a 1:1 manner, depending on host availability and host resource availability. That is, a user may prefer there be one pod request 1106 deployed per host 1108. In other implementations a user may prefer a different distribution approach for some purpose, for example for more efficiency in pod request distribution, and thus choose to fit as many pod requests 1106 as possible on a single host 1108. As seen in FIG. 11, exemplary pod requests 1106 P0 and P1 are both deployed to exemplary host 1108 H0. H0 has a host resource 1110 availability of 6 CPU and 8 GB, while both P0 and P1 have resource requirements 706 for 3 CPU and 4 GB, allowing the pod requests 1106 to fit neatly on H0. By such a policy, a user may enforce storage and compute requirements for all pod requests 1106 to be on a same host 1108. A host 1108 may be a node, rack, datacenter, virtual machine, physical computer, or other device or implementation of a device capable of hosting pod requests 1106. By hosting multiple pod requests 1106 on a same host 1108, each pod request 1106 and associated storage volume(s) may be associated with the same infrastructure piece to improve performance.

Figure 12:
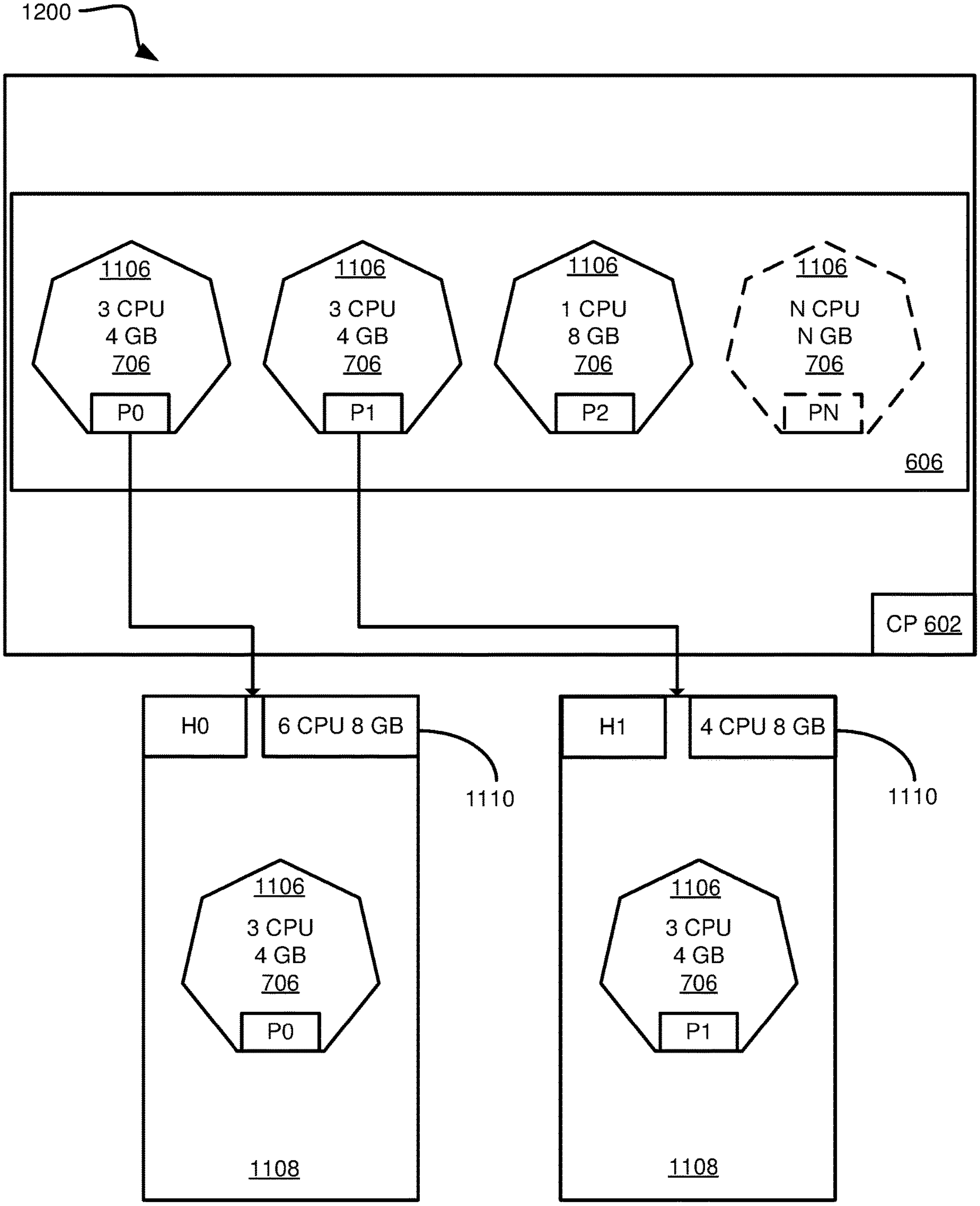
FIG. 12 shows a schematic diagram of a pod request batch sorting pods to different hosts.

FIG. 12 shows a schematic diagram of an overview 1200 of a batch 606 of pod requests 1106 sorting multiple pod requests 1106, each to a single host 1108 regardless of host resource 1110 availability. In FIG. 12, exemplary pod request 1106 P0 is deployed to exemplary host 1108 H0 while exemplary pod request 1106 P1 is deployed to exemplary host 1108 H1. H0 has sufficient host resources 1110 to host both P0 and P1, which have similar resource requirements 706. In this implementation a user has configured the system such that the scheduler on the control plane 602 should deploy each pod request 1106 to a separate host 1108. As a setting, a user may tailor the system to prevent placing more than one pod request 1106 on a host 1108, whereby a host may be a node, rack, or datacenter, virtual machine, physical computer, or other device or implementation of a device capable of hosting pod requests 1106. Distributing pod requests 1106 in the manner exemplified may ensure that every deployed pod is placed on a different host 1108 within a specified infrastructure. In some implementations it may not be possible to deploy pod requests 1106 in this manner, in which case the deployment may fail. Deployment may fail for reasons that could include insufficient resource availability, power outages of some hosts, scenarios where the number of pod requests batched exceed the number of available hosts, or other reasons. In such cases, a user may define backup hosts to deploy pods to when an initial deployment attempt is not successful.

A one-pod-per-host configuration may ensure that the resource requirements 706 of many pod requests 1106, within a batch 606 do not pile up and place strain on one infrastructure piece containing hosts 1108 alone. In some implementations, a one-pod-per-host configuration may resemble a round-robin placement of pods within different hosts 1108. Such a policy may ensure that every deployed pod is placed on a different instance within a specified infrastructure component, depending on available resources 1110. Distributing pod requests 1106 this way may spread the resource requirements 706 of a total number of pod requests 1106 within a batch 606 as much as possible to conserve resources.

Figure 13:
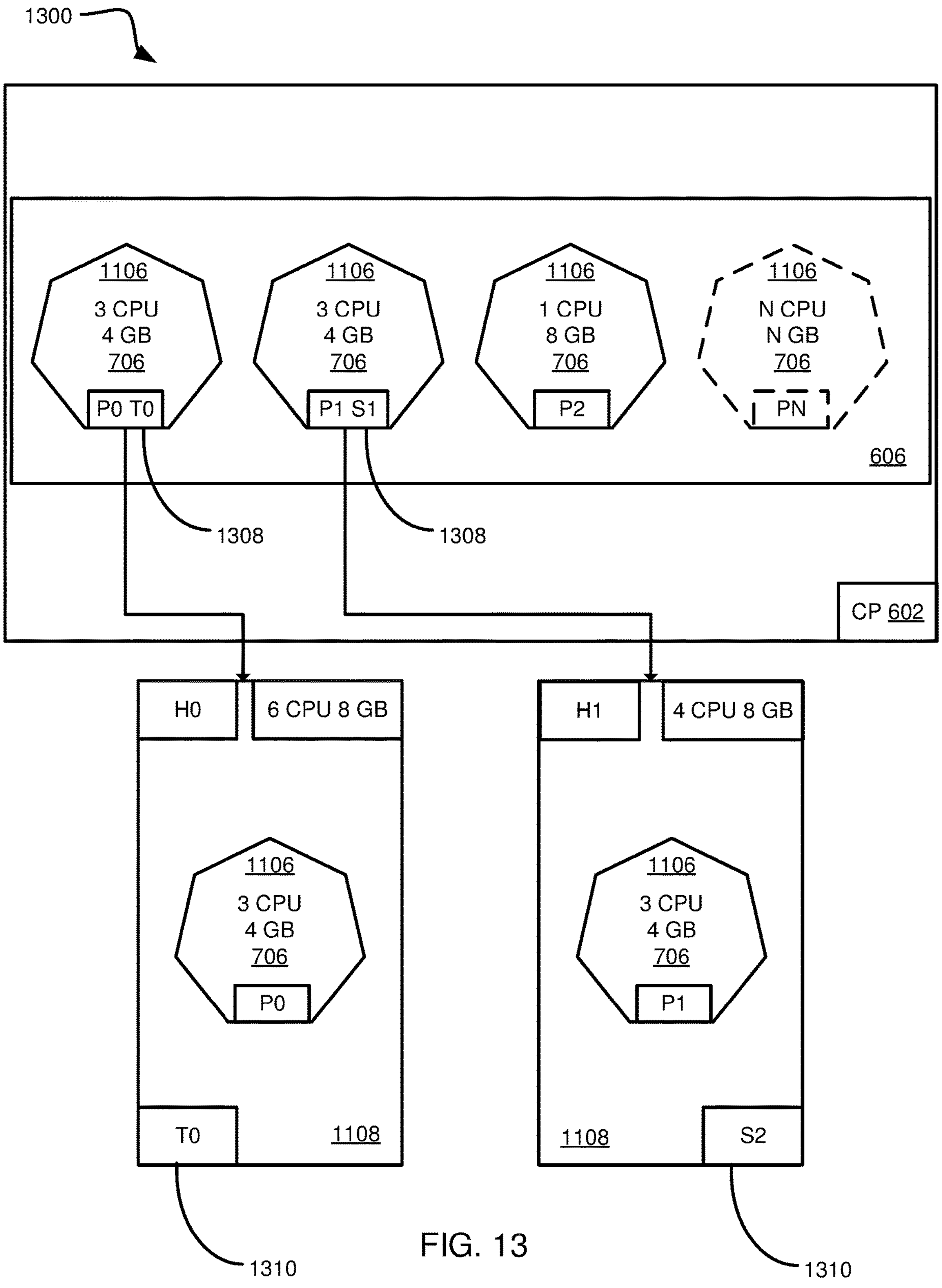
FIG. 13 shows a schematic diagram of a pod request batch sorting pods to different hosts according to user-specified annotations.

FIG. 13 shows a schematic diagram of an overview 1300 of a batch 606 of pod requests 1106 sorting multiple pod requests 1106 according to user annotations 1308. A user may restrict or otherwise dictate the placement of pod requests 1106 by the scheduler on the control plane 602 to hosts 1108 tagged with user-specified host tags 1310 ([key: value, . . . ]). This may ensure sure that every deployed pod 1106 is placed only on hosts 1108 tagged with a host tag 1310 matching the pod annotation 1308. This may allow a user to control where a set of pod requests 1106 are created and deployed to optimize cluster utilization. In FIG. 13, exemplary pod request 1106 P0 is annotated with an exemplary "TO" annotation 1308. P0's annotation 1308 matches the host tag 1310 of exemplary host H0, and thus P0 is deployed to H0. A user may utilize annotation-tag pairs for a variety of reasons. In some implementations the pair may be used to indicate help a user keep track of which pod requests 1106 are deployed to which hosts 1108. In other implementations a user may have a host 1108 configured in such a way, and tagged 1310 accordingly, that the user wants specific pod requests 1106 specially annotated 1308 to deploy to those hosts 1108. Those skilled in the art will appreciate that annotation-tag pairs may provide users with a great degree of flexibility and control over the sorting of pod requests 1106 on a system and by these pairs may sort pod requests 1106 according to the user's needs.

Also shown in FIG. 13, in some implementations, a user may configure the scheduler on the control plane 602 to place pod requests 1106 for a specified service on a host which is running a different specified service. This may ensure that every pod request 1106 deployed for a particular role may be deployed to a host that is also hosting pods running a different, specified service. This may be done, for example, to ensure that pod requests 1106 running complementary services that may need to communicate can be co-located on a same host 1108. In FIG. 13, exemplary pod request P1 is annotated 1308 for exemplary service "S1" and is deployed to an exemplary host 1108 H1 tagged annotated 1310 as running exemplary service "S2."

In other implementations, a user may specify a configuration whereby the distribution of pods for a specified service avoids placement of pods on host that may be a node, rack, or datacenter which is not running a same specified service. This rule may ensure that every pod deployed for a particular role is not hosted by a host that is hosting any pods from a different, specified service. For example, the compute aspects of two different pods could be placed on separate hosts to prevent them for competing for the same resources, or some other similar reason. In yet other implementations a user may desire to configure the system in such a way that pods specified for a particular service are hosted on nodes running the same service, or in other implementations a user may specify that pods specified for a particular service are not to be deployed to hosts running that same service. Those skilled in the art will appreciate that many different organizations of pods according to hosts and services are contemplated.

Figure 14:
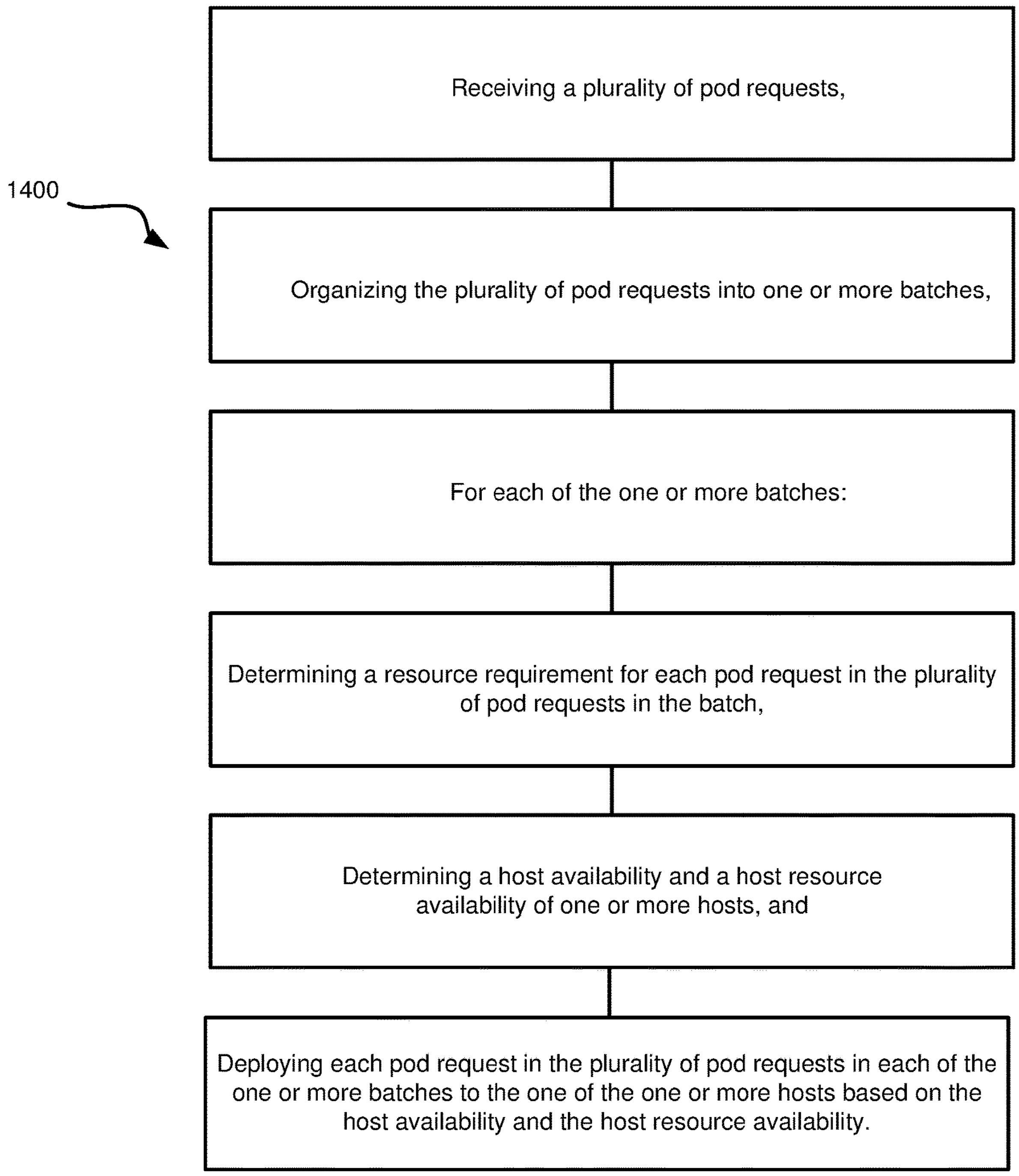
FIG. 14 shows a flowchart diagram of method steps describing a method to batch and deploy a plurality of pod requests.

FIG. 14 shows a flowchart diagram 1400 of method steps describing a method of batching and deploying pod requests. The steps may include receiving a plurality of pod requests, organizing the plurality of pod requests into one or more batches, for each of the one or more batches, determining a resource requirement for each pod request in the plurality of pod requests in the batch, determining a host availability and a host resource availability of one or more hosts, and deploying each pod request in the plurality of pod requests in each of the one or more batches to the one of the one or more hosts based on the host availability and the host resource availability.

Figure 15:
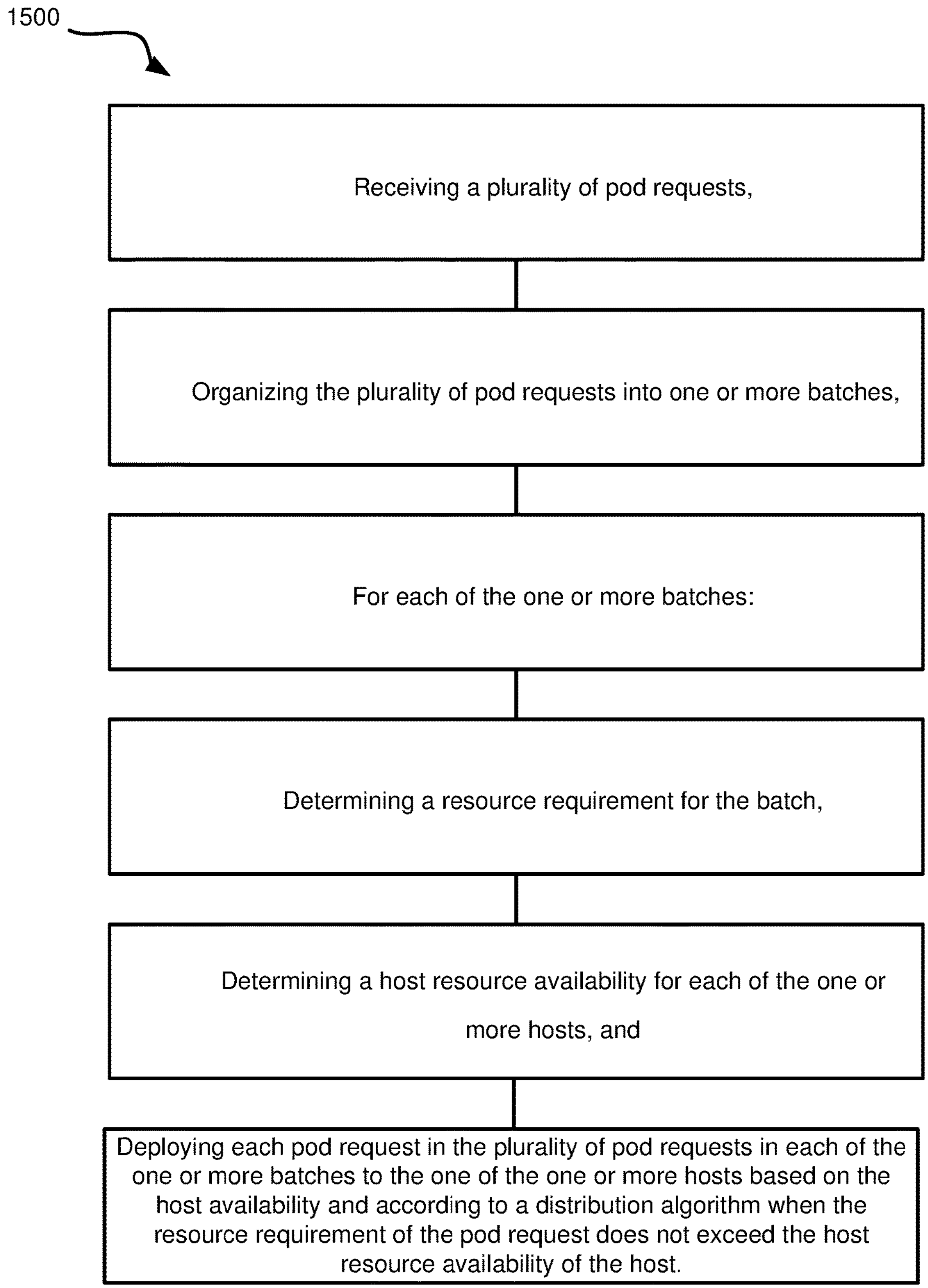
FIG. 15 shows a flowchart diagram of method steps describing a method to batch and deploy a plurality of pod requests according to a specific distribution algorithm.

FIG. 15 shows a flowchart diagram 1500 of method steps describing a method of batching and deploying pod requests according to a distribution algorithm. The steps may include receiving a plurality of pod requests, organizing the plurality of pod requests into one or more batches, for each of the one or more batches, determining a resource requirement for the batch, determining a host resource availability for each of the one or more hosts, and deploying each pod request in each of the one or more batches to the one of the one or more hosts based on the host availability and according to a distribution algorithm when the resource requirement of the pod request does not exceed the host resource availability of the host.

Figure 16:
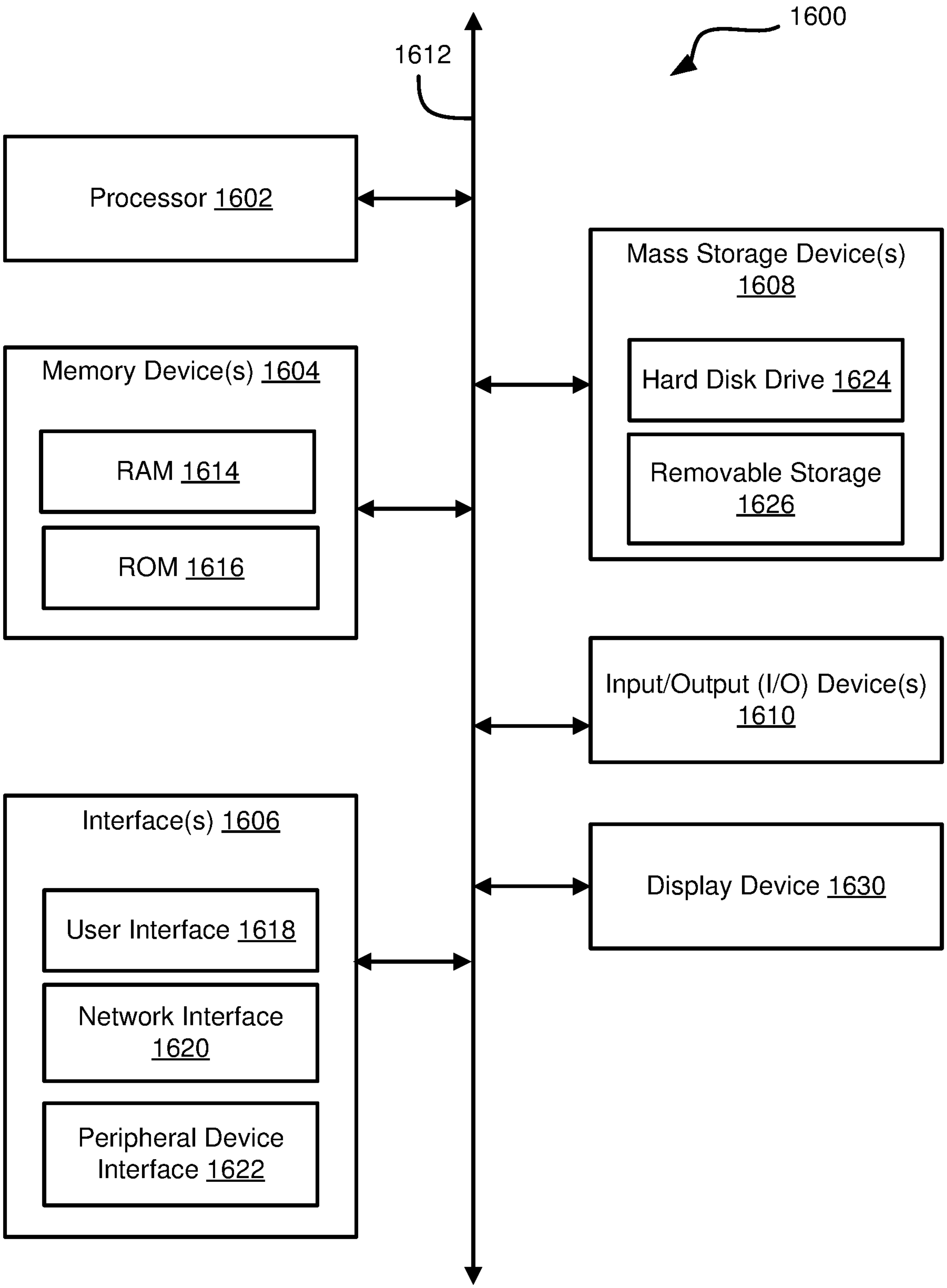
FIG. 16 shows a schematic diagram of an exemplary computing device.

FIG. 16 illustrates a schematic block diagram of an example computing device 1600. The computing device 1600 may be used to perform various procedures, such as those discussed herein. The computing device 1600 can perform various monitoring functions as discussed herein, and can execute one or more application programs, such as the application programs or functionality described herein. The computing device 1600 can be any of a wide variety of computing devices, such as a desktop computer, in-dash computer, vehicle control system, a notebook computer, a server computer, a handheld computer, tablet computer and the like.

The computing device 1600 includes one or more processor(s) 1602, one or more memory device(s) 1604, one or more interface(s) 1606, one or more mass storage device(s) 1608, one or more Input/output (I/O) device(s) 1610, and a display device 1630 all of which are coupled to a bus 1612. Processor(s) 1604 include one or more processors or controllers that execute instructions stored in memory device(s) 1604 and/or mass storage device(s) 1608. Processor(s) 1604 may also include several types of computer-readable media, such as cache memory.

Memory device(s) 1604 include various computer-readable media, such as volatile memory (e.g., random access memory (RAM) 1614) and/or nonvolatile memory (e.g., read-only memory (ROM) 1616). Memory device(s) 1604 may also include rewritable ROM, such as Flash memory.

Mass storage device(s) 1608 include various computer readable media, such as magnetic tapes, magnetic disks, optical disks, solid-state memory (e.g., Flash memory), and so forth. As shown in FIG. 16, a particular mass storage device 1608 is a hard disk drive 1624. Various drives may also be included in mass storage device(s) 1608 to enable reading from and/or writing to the various computer readable media. Mass storage device(s) 1608 include removable media 1626 and/or non-removable media.

I/O device(s) 1610 include various devices that allow data and/or other information to be input to or retrieved from computing device 1600. Example I/O device(s) 1610 include cursor control devices, keyboards, keypads, microphones, monitors or other display devices, speakers, printers, network interface cards, modems, and the like.

Display device 1630 includes any type of device capable of displaying information to one or more users of computing device 1600. Examples of display device 1630 include a monitor, display terminal, video projection device, and the like.

Interface(s) 1606 include various interfaces that allow computing device 1600 to interact with other systems, devices, or computing environments. Example interface(s) 1606 may include any number of different network interfaces 1620, such as interfaces to local area networks (LANs), wide area networks (WANs), wireless networks, and the Internet. Other interface(s) include user interface 1618 and peripheral device interface 1622. The interface(s) 1606 may also include one or more user interface elements 1618. The interface(s) 1606 may also include one or more peripheral interfaces such as interfaces for printers, pointing devices (mice, track pad, or any suitable user interface now known to those of ordinary skill in the field, or later discovered), keyboards, and the like.

Bus 1612 allows processor(s) 1604, memory device(s) 1604, interface(s) 1606, mass storage device(s) 1608, and I/O device(s) 1610 to communicate with one another, as well as other devices or components coupled to bus 1612. Bus 1612 represents one or more of several types of bus structures, such as a system bus, PCI bus, IEEE bus, USB bus, and so forth.

For purposes of illustration, programs and other executable program components are shown herein as discrete blocks, such as block 1602 for example, although it is understood that such programs and components may reside at various times in different storage components of computing device 1600 and are executed by processor(s) 1602. Alternatively, the systems and procedures described herein, including programs or other executable program components, can be implemented in hardware, or a combination of hardware, software, and/or firmware. For example, one or more application specific integrated circuits (ASICs) can be programmed to carry out one or more of the systems and procedures described herein.

Various techniques, or certain aspects or portions thereof, may take the form of program code (i.e., instructions) embodied in tangible media, such as floppy diskettes, CD-ROMs, hard drives, a non-transitory computer readable storage medium, or any other machine readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Many of the functional units described in this specification may be implemented as one or more components, which is a term used to more particularly emphasize their implementation independence. For example, a component may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

EXAMPLES

The following examples pertain to further embodiments.

Example 1 is a method for organizing and deploying containerized applications within a cloud-network architecture framework. The steps include receiving a plurality of pod requests. The steps include organizing the plurality of pod requests into one or more batches. The steps include, for each of the one or more batches, determining a resource requirement for each pod request in the plurality of pod requests in the batch. The steps further include determining a host availability and a host resource availability of one or more hosts. The steps further include deploying each pod request in the plurality of pod requests in each of the one or more batches to the one of the one or more hosts based on the host availability and the host resource availability.

Example 2 is a method according to Example 1, wherein the resource requirement for each pod request comprises resource requirements for each pod request within the plurality of pod requests, and wherein the resource requirement count for each pod request within the batch comprises a pod request value and a pod limit value for each pod request.

Example 3 is a method according to Examples 1 or 2, further comprising determining whether a pod request is a critical pod request, wherein the pod request is a critical pod request when the pod request value equals the pod limit value.

Example 4 is a method according to any of Examples 1-3, further comprising deploying critical pod requests to one of the one or more hosts before other pod requests in the batch.

Example 5 is a method according to any of Examples 1-4, wherein deploying each pod request is performed according to a user defined algorithm, and wherein the algorithm is a best-fit distribution.

Example 6 is a method according to any of Examples 1-5, wherein deploying each pod request is performed according to a user defined algorithm, and wherein the algorithm is a first-fit distribution.

Example 7 is a method according of any of Examples 1-6, wherein determining the host resource availability of the one or more hosts comprises determining whether the host resource availability of the host exceeds the resource requirement count of the pod request.

Example 8 is a method according to any of Examples 1-7, wherein the critical pod request comprises a user-annotation to indicate when a pod request is a critical pod request.

Example 9 is a method according to any of Examples 1-8, wherein deploying the pod requests to one of the one or more hosts comprises deploying the pod requests according to a round-robin distribution.

Example 10 is a method according to any of Examples 1-9, wherein the plurality of pod requests are organized into the batch according to a configuration by a user, and wherein the configuration comprises a number of pod requests or a time period.

Example 11 is a method according to any of Examples 1-10, wherein the one or more hosts comprise a placement policy, and wherein the placement policy determines whether to deploy each pod request to a same host or to a different host.

Example 12 is a method according to any of Examples 1-11, wherein the placement policy determines whether to deploy each pod request to a host according to a user-annotation on the pod and a user-annotation on the host, wherein the user-annotation on the pod and the user-annotation on the host must match.

Example 13 is a method according to any of Examples 1-12, wherein the placement policy determines whether to deploy each pod request to a host according to whether the host is running a service, and wherein the placement policy determines whether to deploy each pod request to the host whether or not the host is running the service.

Example 14 is a system comprising a memory and a computer-readable storage medium comprising programming instructions thereon that when executed, cause the system to receive a plurality of pod requests, organize the plurality of pod requests into one or more batches, for each batch, determine a resource requirement for each pod request in the plurality of pod requests in the batch, determine a host availability and a host resource availability of one or more hosts, and deploy each pod request in the plurality of pod requests in each of the one or more batches to the one of the one or more hosts based on the host availability and the host resource availability.

Example 15 is a system according to Example 14, wherein the resource requirement for each pod request comprises resource requirements for each pod request within the plurality of pod requests, and wherein the resource requirement count for each pod request within the batch comprises a pod request value and a pod limit value for each pod request.

Example 16 is a system according to Examples 14 or 15, wherein the programming instructions further cause the system to determine whether a pod request is a critical pod request, wherein the pod request is a critical pod request when the pod request value equals the pod limit value.

Example 17 is a system according to any of Examples 14-16, wherein the programming instructions further cause the system to deploy critical pod requests to one of the one or more hosts before other pod requests in the batch.

Example 18 is a system according to any of Examples 14-17, wherein the programming instructions further cause the system to deploy each pod request according to a user defined algorithm, and wherein the algorithm is a best-fit distribution.

Example 19 is a system according to any of Examples 14-18, wherein the programming instructions further cause the system to deploy each pod request according to a user defined algorithm, and wherein the algorithm is a first-fit distribution.

Example 20 is a system according of any of Examples 14-19, wherein determining the host resource availability of the one or more hosts comprises determining whether the host resource availability of the host exceeds the resource requirement count of the pod request.

Example 21 is a system according to any of Examples 14-19, wherein the critical pod request comprises a user-annotation to indicate when a pod request is a critical pod request.

Example 22 is a system according to any of Examples 14-19, wherein deploying the pod requests to one of the one or more hosts comprises deploying the pod requests according to a round-robin distribution.

Example 23 is a system according to any of Examples 14-19, wherein the plurality of pod requests are organized into the batch according to a configuration by a user, and wherein the configuration comprises a number of pod requests or a time period.

Example 24 is a system according to any of Examples 14-19, wherein the one or more hosts comprise a placement policy, and wherein the placement policy determines whether to deploy each pod request to a same host or to a different host.

Example 25 is a method according to any of claims 14-19, wherein the placement policy determines whether to deploy each pod request to a host according to a user-annotation on the pod and a user-annotation on the host, wherein the user-annotation on the pod and the user-annotation on the host must match.

Example 26 is a method according to any of claims 14-19, wherein the placement policy determines whether to deploy each pod request to a host according to whether the host is running a service, and wherein the placement policy determines whether to deploy each pod request to the host whether or not the host is running the service.

Example 27 is a method comprising receiving a plurality of pod requests, organizing the plurality of pod requests into one or more batches, for each batch, determining a resource requirement for the batch, determining an availability of one or more hosts, and for each pod request in each batch, deploying each pod request to one of the one or more hosts according to the host availability and a distribution algorithm when the resource requirement of the pod request does not exceed the host resource count of the host.

What is claimed is:

1. A method for organizing and deploying containerized applications within a cloud-network architecture framework, comprising:

receiving a plurality of pod requests to be sent to a control plane to create pods;

organizing the plurality of pod requests into one or more batches before sending the plurality of pod requests to a scheduler on the control plane wherein the plurality of pod requests are organized into the one or more batches according to a configuration by a user, and wherein the configuration indicates how many pod requests of the plurality of pod requests are included per batch, or a time period of collecting a group of pod requests of the plurality of pod requests into a batch;

for each of the one or more batches:

determining, at the scheduler, a resource requirement and a priority for each pod request in the plurality of pod requests in the batch;

determining, at the scheduler, a host availability and a host resource availability of one or more hosts; and deploying each pod request in the plurality of pod requests in each of the one or more batches to at least one of the one or more hosts based on the resource requirement and the priority for each pod request, the host availability, and the host resource availability.

2. The method of claim 1, wherein the resource requirement for each pod request comprises resource requirements for each pod request within the plurality of pod requests, and wherein a count for the resource requirement for each pod request within the batch comprises a pod request value and a pod limit value for each pod request.

3. The method of claim 2, further comprising determining whether a pod request is a critical pod request, wherein the pod request is a critical pod request when the pod request value equals the pod limit value.

4. The method of claim 3, further comprising deploying critical pod requests to one of the one or more hosts before other pod requests in the batch.

5. The method of claim 1, wherein deploying each pod request is performed according to a user defined algorithm, and wherein the algorithm is a best-fit distribution.

6. The method of claim 1, wherein deploying each pod request is performed according to a user defined algorithm, and wherein the algorithm is a first-fit distribution.

7. The method of claim 1, wherein determining the host resource availability of the one or more hosts comprises determining whether the host resource availability of the host exceeds a count for the resource requirement of the pod request.

8. The method of claim 3, wherein the critical pod request comprises a user-annotation to indicate when a pod request is a critical pod request.

9. The method of claim 1, wherein deploying the pod requests to one of the one or more hosts comprises deploying the pod requests according to a round-robin distribution.

10. The method of claim 1, wherein the one or more hosts comprise a placement policy, and wherein the placement policy determines whether to deploy each pod request to a same host or to a different host.

11. The method of claim 10, wherein the placement policy determines whether to deploy each pod request to a host according to a user-annotation on the pod and a user-annotation on the host, wherein the user-annotation on the pod and the user-annotation on the host must match.

12. The method of claim 10, wherein the placement policy determines whether to deploy each pod request to a host according to whether the host is running a service, and wherein the placement policy determines whether to deploy each pod request to the host whether or not the host is running the service.

13. A system comprising:

a memory; and a computer-readable storage medium comprising programming instructions thereon that when executed, cause the system to:

receive a plurality of pod requests to be sent to a control plane to create pods;

organizing the plurality of pod requests into one or more batches before sending the plurality of pod requests to a scheduler on the control plane;

for each batch wherein the plurality of pod requests are organized into the one or more batches according to a configuration by a user, and wherein the configuration indicates how many pod requests of the plurality of pod requests are included per batch, or a time period of collecting a group of pod requests of the plurality of pod requests into a batch:

determine, at the scheduler, a resource requirement and a priority for each pod request in the plurality of pod requests in the batch;

determine, at the scheduler, a host availability and a host resource availability of one or more hosts; and deploy each pod request in the plurality of pod requests in each of the one or more batches to at least one of the one or more hosts based on the resource requirement and the priority for each pod request, the host availability, and the host resource availability.

14. The system of claim 13, wherein the resource requirement for the batch comprises a resource requirement for each pod request within the plurality of pod requests, and wherein the resource requirement for each pod request within the batch comprises a pod request value and a pod limit value for each pod request.

15. The system of claim 13, wherein the programming instructions further cause the system to determine the availability status of the one or more hosts by determining whether the host resource availability of the host exceeds a count for the resource requirement count of the pod request.

16. The system of claim 13, wherein the one or more hosts comprise a placement policy, and wherein the placement policy determines whether to deploy each pod request to a same host or to a different host.

17. The system of claim 16, wherein the placement policy determines whether to deploy each pod request to a host according to a user-annotation on the pod and a user-annotation on the host, wherein the user-annotation on the pod and the user-annotation on the host must match.

18. The system of claim 17, wherein the placement policy determines whether to deploy each pod request to a host according to whether the host is running a service, and wherein the placement policy determines whether to deploy each pod request to the host whether or not the host is running the service.

19. A method comprising:

receiving a plurality of pod requests to be sent to a control plane to create pods;

organizing the plurality of pod requests into one or more batches before sending the plurality of pod requests to a scheduler on the control plane;

for each of the one or more batches wherein the plurality of pod requests are organized into the one or more batches according to a configuration by a user, and wherein the configuration indicates how many pod requests of the plurality of pod requests are included per batch, or a time period of collecting a group of pod requests of the plurality of pod requests into a batch:

determining, at the scheduler, a resource requirement and a priority for each pod request in the plurality of pod requests in the batch;

determining, at the scheduler, a host availability and a host resource availability of one or more hosts; and deploying each pod request in the plurality of pod requests in each of the one or more batches to at least one of the one or more hosts based on the resource requirement and the priority for each pod request, the host availability, and the host resource availability.

* * * * *